United States Patent
Rached (10) Patent No.: US 11,629,278 B2
(45) Date of Patent: Apr. 18, 2023

(54) HEAT TRANSFER COMPOSITIONS AS REPLACEMENT FOR R-134A

(71) Applicant: ARKEMA FRANCE, Colombes (FR)

(72) Inventor: Wissam Rached, Colombes (FR)

(73) Assignee: ARKEMA FRANCE, Colombes (FR)

( * ) Notice: Subject to any disclaimer, the term of this patent is extended or adjusted under 35 U.S.C. 154(b) by 70 days.

(21) Appl. No.: 16/962,143

(22) PCT Filed: Feb. 13, 2019

(86) PCT No.: PCT/FR2019/050316
§ 371 (c)(1),
(2) Date: Jul. 14, 2020

(87) PCT Pub. No.: WO2019/158856
PCT Pub. Date: Aug. 22, 2019

(65) Prior Publication Data
US 2020/0407613 A1    Dec. 31, 2020

(30) Foreign Application Priority Data
Feb. 15, 2018  (FR) .................................... 1851280

(51) Int. Cl.
*C09K 5/04* (2006.01)
*C10M 105/38* (2006.01)
(Continued)

(52) U.S. Cl.
CPC ........... *C09K 5/045* (2013.01); *C10M 105/38* (2013.01); *C09K 2205/126* (2013.01);
(Continued)

(58) Field of Classification Search
CPC .............. C09K 5/045; C09K 2205/126; C09K 2205/24; C09K 2205/40; C10M 105/38;
(Continued)

(56) References Cited

U.S. PATENT DOCUMENTS

| 4,755,316 A | 7/1988 | Magid et al. |
| 4,971,712 A | 11/1990 | Gorski et al. |

(Continued)

FOREIGN PATENT DOCUMENTS

| EP | 2947136 A1 | 11/2015 |
| FR | 2964975 A1 | 3/2012 |

(Continued)

OTHER PUBLICATIONS

Walker, Bryon, HVAC Training—Superheat, Jan. 30, 2013 (Year: 2013) https://www.hvactrainingsolutions.net/hvac-training-superheat.*

(Continued)

*Primary Examiner* — Cephia D Toomer
(74) *Attorney, Agent, or Firm* — Buchanan Ingersoll & Rooney P.C.

(57) ABSTRACT

A method for transferring heat using a heat transfer facility containing a heat transfer composition, said heat transfer composition including a refrigerant, which includes 2,3,3,3-tetrafluoropropene, and a lubricant. The lubricant includes a polyol ester, and the solubility of the 2,3,3,3-tetrafluoropropene in the lubricant at 0° C. and at an absolute pressure of 2.2 bar is less than the solubility of 1,1,1,2-tetrafluoroethane in the lubricant at 0° C. and at an absolute pressure of 2.0 bar. A method including the successive steps of: evaporating a refrigerant; superheating the refrigerant; and compressing the refrigerant.

22 Claims, 2 Drawing Sheets

(51) Int. Cl.
*C10N 30/02* (2006.01)
*C10N 40/30* (2006.01)

(52) U.S. Cl.
CPC ...... *C09K 2205/24* (2013.01); *C09K 2205/40* (2013.01); *C10M 2207/2835* (2013.01); *C10N 2030/02* (2013.01); *C10N 2040/30* (2013.01)

(58) Field of Classification Search
CPC ....... C10M 2207/2835; C10N 2030/02; C10N 2040/30
See application file for complete search history.

(56) References Cited

U.S. PATENT DOCUMENTS

| | | | |
|---|---|---|---|
| 4,975,212 | A | 12/1990 | Thomas et al. |
| 5,008,028 | A | 4/1991 | Jolley et al. |
| 7,279,451 | B2 | 10/2007 | Singh et al. |
| 7,534,366 | B2 | 5/2009 | Singh et al. |
| 8,070,977 | B2 | 12/2011 | Rached |
| 8,075,798 | B2 | 12/2011 | Rached |
| 8,246,850 | B2 | 8/2012 | Rached |
| 8,252,198 | B2 | 8/2012 | Rached |
| 8,557,135 | B2 | 10/2013 | Rached |
| 8,685,271 | B2 | 4/2014 | Carr et al. |
| 8,808,569 | B2 | 8/2014 | Rached |
| 8,858,824 | B2 | 10/2014 | Boussand |
| 8,858,825 | B2 | 10/2014 | Guerin et al. |
| 9,011,711 | B2 | 4/2015 | Rached |
| 9,028,706 | B2 | 5/2015 | Rached et al. |
| 9,039,922 | B2 | 5/2015 | Rached |
| 9,127,191 | B2 | 9/2015 | Rached |
| 9,133,379 | B2 | 9/2015 | Rached |
| 9,175,203 | B2 | 11/2015 | Rached |
| 9,267,064 | B2 | 2/2016 | Rached |
| 9,315,708 | B2 | 4/2016 | Guerin et al. |
| 9,399,726 | B2 | 7/2016 | Rached |
| 9,505,968 | B2 | 11/2016 | Rached |
| 9,512,343 | B2 | 12/2016 | Rached et al. |
| 9,599,381 | B2 | 3/2017 | Rached |
| 9,650,551 | B2 | 5/2017 | Collier et al. |
| 9,650,553 | B2 | 5/2017 | Deur-Bert et al. |
| 9,663,697 | B2 | 5/2017 | Rached |
| 9,676,984 | B2 | 6/2017 | Guerin et al. |
| 9,683,155 | B2 | 6/2017 | Deur-Bert et al. |
| 9,683,157 | B2 | 6/2017 | Rached |
| 9,884,984 | B2 | 2/2018 | Rached |
| 9,908,828 | B2 | 3/2018 | Rached et al. |
| 9,969,918 | B2 | 5/2018 | Deur-Bert et al. |
| 10,023,780 | B2 | 7/2018 | Guerin et al. |
| 10,035,938 | B2 | 7/2018 | Rached |
| 10,119,055 | B2 | 11/2018 | Boussand |
| 10,125,296 | B2 | 11/2018 | Rached |
| 10,131,829 | B2 | 11/2018 | Deur-Bert et al. |
| 10,252,913 | B2 | 4/2019 | Bonnet et al. |
| 10,316,231 | B2 | 6/2019 | Rached |
| 10,358,592 | B2 | 7/2019 | Rached |
| 10,377,935 | B2 | 8/2019 | Guerin et al. |
| 10,399,918 | B2 | 9/2019 | Rached |
| 10,450,488 | B2 | 10/2019 | Boussand |
| 10,604,690 | B2 | 3/2020 | Collier et al. |
| 10,618,861 | B2 | 4/2020 | Rached |
| 10,662,357 | B2 | 5/2020 | Boussand |
| 10,808,157 | B2 | 10/2020 | Rached |
| 10,858,562 | B2 | 12/2020 | Rached |
| 10,954,467 | B2 | 3/2021 | Rached |
| 2003/0032563 | A1 | 2/2003 | Tazaki |
| 2004/0089839 | A1 | 5/2004 | Thomas et al. |
| 2004/0119047 | A1 | 6/2004 | Singh et al. |
| 2005/0145823 | A1 | 7/2005 | Yamada et al. |
| 2006/0243944 | A1 | 11/2006 | Minor et al. |
| 2006/0243945 | A1 | 11/2006 | Minor et al. |
| 2007/0004605 | A1 | 1/2007 | Matsumura et al. |
| 2009/0241562 | A1 | 10/2009 | Thomas et al. |
| 2010/0047189 | A1 | 2/2010 | Seeton et al. |
| 2010/0175421 | A1 | 7/2010 | Kaneko et al. |
| 2010/0282999 | A1 | 11/2010 | Shimomura et al. |
| 2011/0084228 | A1 | 4/2011 | Rached |
| 2011/0095224 | A1 | 4/2011 | Rached |
| 2011/0120175 | A1 | 5/2011 | Kamashima et al. |
| 2011/0186772 | A1 | 8/2011 | Rached |
| 2011/0219791 | A1 | 9/2011 | Rached |
| 2011/0219792 | A1 | 9/2011 | Rached |
| 2011/0240254 | A1 | 10/2011 | Rached |
| 2011/0284181 | A1 | 11/2011 | Rached |
| 2012/0024007 | A1 | 2/2012 | Ota et al. |
| 2012/0049104 | A1 | 3/2012 | Rached |
| 2012/0056123 | A1 | 3/2012 | Rached |
| 2012/0068105 | A1 | 3/2012 | Rached et al. |
| 2012/0144857 | A1 | 6/2012 | Rached |
| 2012/0151958 | A1 | 6/2012 | Rached |
| 2012/0151959 | A1 | 6/2012 | Rached |
| 2012/0153213 | A1 | 6/2012 | Rached |
| 2012/0159982 | A1 | 6/2012 | Rached |
| 2012/0161064 | A1 | 6/2012 | Rached |
| 2012/0167615 | A1 | 7/2012 | Rached |
| 2012/0205574 | A1 | 8/2012 | Rached et al. |
| 2012/0272668 | A1 | 11/2012 | Van Horn et al. |
| 2012/0298909 | A1 | 11/2012 | Low |
| 2013/0092869 | A1 | 4/2013 | Boussand |
| 2013/0105724 | A1 | 5/2013 | Boussand |
| 2013/0186114 | A1 | 7/2013 | Guerin et al. |
| 2014/0008565 | A1 | 1/2014 | Rached et al. |
| 2014/0075969 | A1 | 3/2014 | Guerin et al. |
| 2014/0318160 | A1 | 10/2014 | Rached |
| 2014/0326017 | A1 | 11/2014 | Rached |
| 2015/0027146 | A1 | 1/2015 | Boussand |
| 2015/0152306 | A1 | 6/2015 | Rached |
| 2015/0152307 | A1 | 6/2015 | Rached |
| 2015/0322317 | A1 | 11/2015 | Collier et al. |
| 2015/0322321 | A1 | 11/2015 | Deur-Bert et al. |
| 2015/0344761 | A1 | 12/2015 | Rached |
| 2015/0353799 | A1 | 12/2015 | Deur-Bert et al. |
| 2015/0353802 | A1 | 12/2015 | Rached |
| 2016/0009555 | A1 | 1/2016 | Bonnet et al. |
| 2016/0024363 | A1 | 1/2016 | Rached |
| 2016/0025394 | A1 | 1/2016 | Rached |
| 2016/0053153 | A1 | 2/2016 | Okido et al. |
| 2016/0115361 | A1 | 4/2016 | Boussand |
| 2016/0122609 | A1 | 5/2016 | Rached |
| 2016/0194541 | A1 | 7/2016 | Guerin et al. |
| 2016/0244652 | A1 | 8/2016 | Rached |
| 2016/0272561 | A1 | 9/2016 | Rached et al. |
| 2016/0298014 | A1 | 10/2016 | Rached |
| 2016/0333241 | A1 | 11/2016 | Fukushima et al. |
| 2016/0355718 | A1 | 12/2016 | Rached |
| 2016/0376484 | A1 | 12/2016 | Guerin et al. |
| 2017/0037291 | A1 | 2/2017 | Rached et al. |
| 2017/0080773 | A1 | 3/2017 | Rached |
| 2017/0145276 | A1 | 5/2017 | Rached |
| 2017/0210960 | A1 | 7/2017 | Deur-Bert et al. |
| 2017/0210962 | A1 | 7/2017 | Collier et al. |
| 2017/0218241 | A1 | 8/2017 | Deur-Bert et al. |
| 2017/0218242 | A1 | 8/2017 | Rached |
| 2018/0086173 | A1 | 3/2018 | Rached |
| 2018/0134936 | A1 | 5/2018 | Rached |
| 2018/0148395 | A1 | 5/2018 | Rached et al. |
| 2018/0244970 | A1 | 8/2018 | Rached |
| 2018/0282603 | A1 | 10/2018 | Guerin et al. |
| 2018/0327645 | A1 | 11/2018 | Boussand |
| 2019/0023957 | A1 | 1/2019 | Rached |
| 2019/0203094 | A1 | 7/2019 | Rached |
| 2019/0249057 | A1 | 8/2019 | Rached |
| 2019/0284500 | A1 | 9/2019 | Rached |
| 2019/0337874 | A1 | 11/2019 | Rached et al. |
| 2019/0359870 | A1 | 11/2019 | Rached |
| 2019/0367789 | A1 | 12/2019 | Rached |
| 2020/0048518 | A1 | 2/2020 | Rached |
| 2020/0216734 | A1 | 7/2020 | Rached et al. |

(56) References Cited

U.S. PATENT DOCUMENTS

| | | | |
|---|---|---|---|
| 2021/0017107 A1 | 1/2021 | Deur-Bert et al. | |
| 2021/0046802 A1 | 2/2021 | Rached | |

FOREIGN PATENT DOCUMENTS

| | | | |
|---|---|---|---|
| JP | 2005-171233 A | 6/2005 | |
| JP | 2010-024410 | 2/2010 | |
| JP | 2011-246587 | 12/2011 | |
| WO | WO 01/48127 A1 | 7/2001 | |
| WO | WO 2004/037913 A2 | 5/2004 | |
| WO | WO 2005/042663 A1 | 5/2005 | |
| WO | WO 2005/103187 A1 | 11/2005 | |
| WO | WO 2006/094303 A2 | 9/2006 | |
| WO | WO 2008/153106 A1 | 12/2008 | |
| WO | WO 2009/057475 A1 | 5/2009 | |
| WO | 2009124128 A1 | 10/2009 | |
| WO | WO 2010/010917 A1 | 1/2010 | |
| WO | WO 2010/022018 A2 | 2/2010 | |
| WO | 2010083100 A1 | 7/2010 | |
| WO | WO 2011/023923 A | 3/2011 | |
| WO | 2012001255 A2 | 1/2012 | |
| WO | 2012177742 A2 | 12/2012 | |
| WO | 2016209560 A1 | 12/2016 | |
| WO | 2018069621 A1 | 4/2018 | |

OTHER PUBLICATIONS

International Search Report (with English Translation) and Written Opinion issued in corresponding International Patent Application No. PCT/FR2019/050316, 19 pages (dated May 21, 2019).

Bitzer, "Technical information. KT-510-6," https://www.gtex.nl/downloadfile.aspx?file=kt-210-6.pdf, pp. 1-24, (Dec. 8, 2016).

Henderson, D.R., "Solubility, viscosity and density of refrigerant/lubricant mixtures: Final Technical Report," Spauschus Associates, Inc., Stockbridge, GA USA, 149 pp. (Apr. 1994).

"Global Ozone Research and Monitoring Project—Report No. 47, Scientific Assessment of Ozone Depletion," World Meteorological Organization, 485 pp (2002).

Karnaz, J., "Lubricant Development To Meet Lower GWP Refrigerant Challenges," International Refrigeration and Air Conditioning Conference, 11 pp. (Jan. 1, 2014).

Karnaz, J.A., "Evaluating Lubricants for Lower GWP Refrigerant Compressor Operation," 16th International Refrigeration and Air Conditioning Conference at Purdue, School of Mechanical Engineering, 11 pp. (Jul. 11-14, 2016).

Motta, Y., et al. "Analysis of LGWP Alternatives for Small Refrigeration (Plugin) Applications," International Refrigeration and Air Conditioning Conference at Purdue, School of Mechanical Engineering, 7 pp. (2010).

Navarro, E et al., "Comparative experimental study of an open piston compressor working with R-1234yf, R-134a and R-290," International Journal of Refrigeration, Elsevier, Paris, France, vol. 36, No. 3, pp. 768-775 (Nov. 24, 2012).

Neto, et al., "Convection-driven Absorption of R-1234yf in Lubricating Oil," International Journal of Refrigeration, Elsevier Ltd and IIR, 44:151-160 (2014).

U.S. Appl. No. 17/164,888, Wissam Rached, filed Feb. 2, 2021.

U.S. Appl. No. 17/164,888, Rached.

\*\*Rached, Wissam, U.S. Appl. No. 17/164,888 entitled "Use of Tetrafluoropropene Based Compositions," filed in the U.S. Patent and Trademark Office on Feb. 2, 2021.

U.S. Appl. No. 16/965,533, Wissam Rached, filed Jul. 28, 2020.

U.S. Appl. No. 17/147,202, Wissam Rached and Béatrice Boussand, filed Jan. 12, 2021.

U.S. Appl. No. 15/368,347, Wissam Rached, filed Dec. 2, 2016, (Cited herein as US Patent Application Publication No. 2017/0080773 A1 of Mar. 23, 2017).

U.S. Appl. No. 16/142,492, Wissam Rached, filed Sep. 26, 2018, (Cited herein as US Patent Application Publication No. 2019/0203094 A1 of Jul. 4, 2019).

U.S. Appl. No. 16/339,956, Wissam Rached, filed Apr. 5, 2019, (Cited herein as US Patent Application Publication No. 2019/0284500 A1 of Sep. 19, 2019).

U.S. Appl. No. 16/395,413, Wissam Rached, filed Apr. 26, 2019, (Cited herein as US Patent Application Publication No. 2019/0249057 A1 of Aug. 15, 2019).

U.S. Appl. No. 16/339,903, Wissam Rached, filed Apr. 5, 2019, (Cited herein as US Patent Application Publication No. 2020/0048518 A1 of Feb. 13, 2020).

U.S. Appl. No. 16/477,263, Wissam Rached, filed Jul. 11, 2019, (Cited herein as US Patent Application Publication No. 2019/0359870 A1 of Nov. 28, 2019).

U.S. Appl. No. 16/477,318, Wissam Rached, filed Jul. 11, 2019, (Cited herein as US Patent Application Publication No. 2019/0367789 A1 of Dec. 5, 2019).

U.S. Appl. No. 16/965,638, Dominique Deur-Bert, Laurent Wendlinger, Bátrice Berger, filed Jul. 29, 2020, (Cited herein as US Patent Application Publication No. 2021/0017107 A1 of Jan. 21, 2021).

U.S. Appl. No. 16/965,533, Rached.

U.S. Appl. No. 17/147,202, Rached et al.

Puhl, Christian, "Refrigeration Oils for Future Mobile A/C Systems", Fuchs Europe Schmierstoffe, 2009, retrieved from the internet: http://www.r744.com/assets/link/FUCHS_Puhl_VDA%20Winter%20Meeting%202009.pdf, 18 pages.

UCON™ refrigeration compressor lubricants, Dow Automotive Systems, 2 pages, date unknown.

Material Safety Data sheet, "R-134A Refrigerant Oil PAG RL488, Delphi Part No. RI10006", Feb. 15, 2008, 9 pages.

\*\*Rached, Wissam, U.S. Appl. No. 16/965,533 entitled "Method for Cooling and/or Heating a Body or a Fluid in a Motor Vehicle," filed in the U.S. Patent and Trademark Office on Jul. 28, 2020.

\*\*Rached, Wissam, et al., U.S. Appl. No. 17/147,202 entitled "Composition Based on 2,3,3,3-Tetrafluoropropene," filed in the U.S. Patent and Trademark Office on Jan. 12, 2021.

\* cited by examiner

HEAT TRANSFER COMPOSITIONS AS REPLACEMENT FOR R-134A

FIELD OF THE INVENTION

The present invention relates to the use of heat transfer compositions comprising 2,3,3,3-tetrafluoropropene and also a polyol ester lubricant, especially in the context of the replacement of heat transfer compositions based on 1,1,1,2-tetrafluoroethane.

TECHNICAL BACKGROUND

The problems posed by substances that deplete the atmospheric ozone layer were dealt with in Montreal, where the protocol was signed decreeing a reduction in the production and use of chlorofluorocarbons (CFCs). This protocol has been the subject of amendments, which have ordered the abandonment of CFCs and extended the regulation to other products, including hydrochlorofluorocarbons (HCFCs).

The refrigeration and air conditioning industry has made substantial investments in the substitution of refrigerants based on CFCs and HCFCs, and accordingly hydrofluorocarbons (HFCs), which pose little or no harm to the ozone layer, have been commercialized.

In particular, 1,1,1,2-tetrafluoroethane (HFC-134a) is an example of HFC which has known very broad use, for example, in automobile air conditioning.

However, a large number of HFC fluids, including HFC-134a, may make a harmful contribution to the greenhouse effect. This contribution is quantified by a numerical parameter, the GWP (Global Warming Potential).

Hydrofluoroolefins (HFOs) such as 2,3,3,3-tetrafluoropropene (HFO-1234yf) or 1,3,3,3-tetrafluoropropene (HFO-1234ze) constitute low-GWP fluids which can be used in heat transfer applications.

In the majority of applications, heat transfer fluids are used in vapor compression circuits. The fluid therefore undergoes evaporation, followed by compression, condensation and expansion to complete the cycle.

The use of a lubricant (or lubricating oil) is generally required in order to ensure the proper functioning of the mobile mechanical parts in the circuit, and especially to ensure the lubrication of the bearings in the compressor.

Polyol esters (POEs) have in particular been proposed as possible lubricants for HFOs.

Document WO 2009/124128 describes a process for selecting a heat transfer fluid and a lubricant for a vapor compression system.

Document WO 2010/083100 describes heat transfer compositions comprising carbon dioxide and a lubricant based on POE.

The article *Analysis of LGWP Alternatives for Small Refrigeration (Plugin) Applications*, by Yana Motta et al., in *International Refrigeration and Air Conditioning Conference at Purdue* (2010), compares the efficacy of HFO-1234yf and HFO-1234ze in small-scale refrigeration systems.

Document US 2012/024007 describes an air conditioning or refrigeration compressor which is charged with a heat transfer fluid which may among others be HFO-1234yf, and with a lubricant comprising POE.

Document WO 2012/001255 describes compositions comprising a lubricant based on POE and a heat transfer fluid containing at least 99.8% by weight of HFO-1234yf.

Document U.S. Pat. No. 8,685,271 describes a group of POEs and their use with various possible heat transfer fluids.

The article *Lubricant Development To Meet Lower GWP Refrigerant Challenges*, by J. A. Karnaz, in $15^{th}$ *International Refrigeration and Air Conditioning Conference at Purdue* (2014), is focused on the evaluation of lubricants for so-called next-generation heat transfer fluids, including HFO-1234ze.

The article *Convection-driven Absorption of R-1234yf in Lubricating Oil*, by Neto et al., in *International Journal of Refrigeration* 44:151-160 (2014), describes the determination of the degree of absorption of HFO-1234yf across the surface of a layer of ISO VG 10 POE lubricant in a closed system.

Document EP 2947136 describes a lubricating oil which comprises a base oil, a sulfide compound and a gallate. The base oil may especially be POE. This lubricating oil may be used, among others, with HFO-1234yf.

The article *Evaluating Lubricants for Lower GWP Refrigerant Compressor Operation*, by J. A. Karnaz, in $16^{th}$ *International Refrigeration and Air Conditioning Conference at Purdue* (2015), is focused on the evaluation of lubricants for a collective of heat transfer fluids, including in particular mixtures containing HFOs.

Document US 2016/053153 describes heat transfer compositions comprising a tetrafluoropropene and a lubricant based on POE.

Document WO 2016/209560 describes heat transfer compositions comprising a fluorinated olefin and a lubricant based on POE having a kinematic viscosity at 40° C. of 150 to 360 cSt.

A need still exists to provide effective heat transfer processes, especially in the context of highly effective substitution of the heat transfer compositions based on HFC-134a by low-GWP heat transfer compositions.

SUMMARY OF THE INVENTION

The invention relates firstly to a process of heat transfer by means of a heat transfer installation containing a heat transfer composition, the heat transfer composition comprising:
 a refrigerant fluid which comprises 2,3,3,3-tetrafluoropropene, and
 a lubricant;
 in which the lubricant comprises a polyol ester, the solubility of the 2,3,3,3-tetrafluoropropene in the lubricant at 0° C. and at an absolute pressure of 2.2 bar being less than the solubility of 1,1,1,2-tetrafluoroethane in the lubricant at 0° C. and at an absolute pressure of 2.0 bar;
 the process comprising the successive steps:
 of evaporating a refrigerant fluid;
 of superheating the refrigerant fluid;
 of compressing the refrigerant fluid.

In some embodiments, the superheating of the refrigerant fluid is from 1 to 20° C., preferably from 2 to 10° C., more preferably from 3 to 5° C.

In some embodiments, the lubricant comprises a dipentaerythritol ester.

In some embodiments, the lubricant has a kinematic viscosity at 40° C. of 10 to 200 cSt, preferably of 20 to 100 cSt and more preferably of 30 to 80 cSt.

In some embodiments, the process is an air conditioning and/or mobile or stationary heating process or refrigeration, freezing or deep-freezing process.

In some embodiments, the refrigerant fluid is evaporated at an average temperature of less than or equal to 10° C., preferably less than or equal to 0° C., more preferably less than or equal to −10° C.

In some embodiments, the refrigerant fluid is compressed in a screw compressor.

In some embodiments, the heat transfer installation is an installation intended to operate with an initial heat transfer composition comprising:
an initial refrigerant fluid, and
an initial lubricant,
the initial heat transfer composition being different from the heat transfer composition used in the process.

In some embodiments, said heat transfer composition is a replacement heat transfer composition, which is used as replacement for an initial heat transfer composition comprising:
an initial refrigerant fluid, and
an initial lubricant.

In some embodiments, the superheating with the replacement heat transfer composition is less than or equal to the superheating when the same process is implemented with the initial heat transfer composition; and preferably the superheating with the replacement heat transfer composition is less by at least 2° C., preferably by at least 5° C., more preferably by at least 10° C., relative to the superheating when the same process is implemented with the initial heat transfer composition.

In some embodiments, the lubricant of the replacement heat transfer composition is identical to the initial lubricant.

In some embodiments, the lubricant of the replacement heat transfer composition is different from the initial lubricant.

In some embodiments, the lubricant of the replacement heat transfer composition has a kinematic viscosity at 40° C. which is less than or equal to the kinematic viscosity at 40° C. of the initial lubricant, the difference between the kinematic viscosity at 40° C. of the initial lubricant and the kinematic viscosity at 40° C. of the lubricant of the replacement heat transfer composition being preferably greater than or equal to 5 cSt, more preferably greater than or equal to 10 cSt.

In some embodiments, the initial lubricant comprises a polyol ester, and preferably comprises a dipentaerythritol ester.

In some embodiments, the initial refrigerant fluid comprises 1,1,1,2-tetrafluoroethane or consists essentially of 1,1,1,2-tetrafluoroethane.

The present invention makes it possible to satisfy the need expressed above. More particularly, it provides effective heat transfer processes, especially in the context of a highly effective substitution of the heat transfer compositions based on HFC-134a by low-GWP heat transfer compositions.

The invention lies in the finding that HFO-1234yf has relatively low solubility in certain POE oils (and especially in the POE oils of the same type as the ISO 55 POE oil), meaning that it is less soluble than HFO-1234ze and than the reference fluid HFC-134a.

The use of such oils in combination with HFO-1234yf makes it possible to replace heat transfer compositions comprising HFC-134a in a particularly effective way, in heat transfer processes involving superheating after evaporation.

For example, in the context of the replacement of a composition containing HFC-134a by a composition containing HFO-1234yf, the following benefits may be obtained:
a reduction in the superheating on evaporation upon replacement; or
a reduction in the viscosity of the lubricant upon replacement.

It is of course possible to combine these two aspects.

In a heat transfer installation, the lubricant is present primarily in the compressor, in order to lubricate the moving parts. A fraction of the lubricant may, however, be carried outside the compressor and so may circulate throughout the circuit containing the refrigerant fluid.

A first benefit of the invention concerns the reduction in the superheating when the heat transfer composition is changed.

The superheating of the refrigerant fluid after evaporation makes it possible:
to limit the presence of refrigerant fluid in liquid form in the compressor (since liquid compression is a major cause of compressor breakdowns);
to reduce the solubility of refrigerant fluid in the oil in the compressor, and so to prevent foaming and thus, again, liquid compression, especially at start-up;
to limit the loss of viscosity of the oil when it is in contact with the refrigerant fluid, this loss of viscosity being detrimental to the lubrication of the bearings and the moving parts in the compressor; and
to facilitate the separation of the refrigerant fluid and the lubricant at the outlet of the compressor.

Furthermore, the presence of the superheating has the consequence of reducing the performance of the system.

By virtue of selecting a POE lubricant in which the HFO-1234yf has low solubility (in comparison to the reference fluid HFC-134a), the viscosity of the lubricant is relatively little affected in the presence of the HFO-1234yf in the compressor. This makes it possible to reduce the superheating and so to increase the performance, without giving rise to adverse consequences for the prevention of foaming, for lubrication or for the separation of the lubricant and the refrigerant fluid.

The reduction in the superheating is particularly beneficial when the process is used for air conditioning.

A second benefit of the invention concerns the use of an oil of lower viscosity, so as to reduce the frictional forces on the bearings of the compressor, relative to a reference oil, especially in the areas in which the oil is not in a mixture with the refrigerants. The power consumed by a lubrication bearing is proportional to the viscosity of the lubricant.

Reducing the viscosity of the oil also makes it possible to improve the lubrication of the installation on start-up (which may allow the energy consumption associated with the heating of the compressor during this start-up to be limited); and to limit the head losses in the circuit and so to reduce the energy consumption associated with pumping.

One subject of the invention, accordingly, is the use, as replacement heat transfer composition, of a composition comprising:
a replacement refrigerant fluid comprising 2,3,3,3-tetrafluoropropene, and
a replacement lubricant comprising a polyol ester;
in place of an initial heat transfer composition comprising:
an initial refrigerant fluid comprising 1,1,1,2-tetrafluoroethane, and
an initial lubricant;
in a heat transfer process comprising the successive steps:
of evaporating a refrigerant fluid;
of superheating the refrigerant fluid;
of compressing the refrigerant fluid;
in which the superheating when the process is implemented with the replacement heat transfer composition is less than the superheating when the process is implemented with the initial heat transfer composition.

Another subject of the invention is the use, as replacement heat transfer composition, of a composition comprising:
- a replacement refrigerant fluid comprising 2,3,3,3-tetrafluoropropene, and
- a replacement lubricant comprising a polyol ester;

in place of an initial heat transfer composition comprising:
- an initial refrigerant fluid comprising 1,1,1,2-tetrafluoroethane, and
- an initial lubricant;
- in a heat transfer process;

where the replacement lubricant has a kinematic viscosity at 40° C. less than the kinematic viscosity at 40° C. of the initial lubricant.

DESCRIPTION OF EMBODIMENTS OF THE INVENTION

The invention is now described in greater detail and in a nonlimiting manner in the description which follows. Unless indicated otherwise, throughout the application the indicated proportions of compounds are given as percentages by mass.

The invention relates to a heat transfer process which is implemented by means of a heat transfer installation. The installation contains a heat transfer composition.

In some embodiments, the heat transfer installation was originally designed to function with another heat transfer composition, called the initial heat transfer composition (and especially with another refrigerant fluid, called the initial refrigerant fluid).

In some embodiments, the heat transfer composition used in the process of the invention is what is called a replacement heat transfer composition, meaning that the same heat transfer installation was formerly used for implementing a heat transfer process with another heat transfer composition, called the initial heat transfer composition.

The two preceding paragraphs correspond to the assumption of a replacement.

In this case, the initial heat transfer composition consists of what is called an initial refrigerant fluid, what is called an initial lubricant, and optional additives.

The replacement heat transfer composition consists of what is called a replacement refrigerant fluid, what is called a replacement lubricant, and optional additives.

The term "refrigerant fluid" or "heat transfer fluid" refers to a fluid which is capable of absorbing heat by evaporating at low temperature and low pressure and of releasing the heat by condensing at high temperature and high pressure, in a vapor compression circuit, according to the particular application. Generally speaking, a refrigerant fluid may consist essentially of a single compound or may be a mixture of a plurality of compounds.

The replacement refrigerant fluid is different from the initial refrigerant fluid.

In some embodiments, the replacement lubricant is identical to the initial lubricant.

In other embodiments, the replacement lubricant is different from the initial lubricant.

The term "lubricant" is used synonymously with "lubricant oil" or "oil".

In some embodiments, the process of the invention comprises in succession:
- implementation with the initial heat transfer composition;
- the replacement of the initial heat transfer composition by the replacement heat transfer composition; and
- implementation with the replacement heat transfer composition.

In other embodiments, the installation is implemented directly with the replacement heat transfer composition, without being implemented with the initial heat transfer composition despite it being suitable, on the basis of its original design, for operating with the initial heat transfer composition.

This assumption is, by extension, also considered to be a case of "replacement" in the sense of the invention.

General Presentation of the Heat Transfer Process

The heat transfer process of the invention is implemented in a heat transfer installation. The heat transfer installation comprises a vapor compression system. The system contains a heat transfer composition, which provides for the transfer of heat.

In some embodiments, the installation contains:
- initially, the initial heat transfer composition;
- then, after replacement, the replacement heat transfer composition.

The heat transfer process may be a process for heating or cooling a fluid or a body.

In some embodiments, the vapor compression system is:
- an air conditioning system; or
- a refrigeration system; or
- a freezing system; or
- a heat pump system.

The installation may be mobile or stationary.

The heat transfer process may therefore be a stationary air conditioning process (in dwellings or in industrial or commercial premises), or a mobile air conditioning process, especially an automotive air conditioning process, a stationary refrigeration process or mobile refrigeration process (for example, refrigerated transport), or a stationary freezing or deep-freezing process, or a mobile freezing or deep-freezing process (for example, refrigerated transport), or a stationary heating process or mobile heating process (automotive, for example).

The heat transfer process advantageously comprises the following steps, which are implemented cyclically:
- evaporating the refrigerant fluid in an evaporator;
- compressing the refrigerant fluid in a compressor;
- condensing the refrigerant fluid in a condenser; and
- expanding the refrigerant fluid in an expansion module.

The refrigerant fluid may be evaporated from a liquid phase or from a dual-phase liquid/vapor phase.

The compressor may be hermetic, semi-hermetic or open. Hermetic compressors comprise a motor part and a compression part, which are contained within an undismantlable hermetic enclosure. Semi-hermetic compressors comprise a motor part and a compression part, which are assembled directly with one another. The coupling between the motor part and the compression part is accessible by detaching the two parts by dismantling. Open compressors comprise a motor part and a compression part which are separate. They may operate by belt drive or by direct coupling.

The compressor used may especially be a dynamic compressor, or a positive displacement compressor.

Dynamic compressors include axial compressors and centrifugal compressors, which may have one or more stages. Centrifugal mini-compressors may also be employed.

Positive displacement compressors include rotary compressors and reciprocating compressors.

Reciprocating compressors include diaphragm compressors and piston compressors.

Rotary compressors include screw compressors, lobe compressors, scroll (or spiral) compressors, liquid ring compressors, and blade compressors. Screw compressors may preferably be twin-screw or single-screw.

The implementation of the invention is particularly advantageous when a screw compressor is used, insofar as the oil mixed with the refrigerant fluid generally circulates in a relatively large amount in a compressor of this kind.

In the installation which is used, the compressor may be driven by an electric motor or by a gas turbine (fed, for example, by the exhaust gases of a vehicle, for mobile applications) or by gearing.

The evaporator and the condenser are heat exchangers. Use may be made of any type of heat exchanger in the invention, and especially cocurrent heat exchangers or, preferably, countercurrent heat exchangers.

The term "countercurrent heat exchanger" refers to a heat exchanger in which heat is exchanged between a first fluid and a second fluid, the first fluid at the inlet of the exchanger exchanging heat with the second fluid at the outlet of the exchanger, and the first fluid at the outlet of the exchanger exchanging heat with the second fluid at the inlet of the exchanger.

For example, countercurrent heat exchangers include devices in which the flow of the first fluid and the flow of the second fluid are in opposite directions or virtually opposite directions. Exchangers operating in crosscurrent mode with a countercurrent tendency are also included among the countercurrent heat exchangers.

The installation may also optionally comprise at least one heat transfer fluid circuit used to transmit heat (with or without change of state) between the heat transfer composition circuit and the fluid or body to be heated or cooled.

The installation may also optionally comprise two (or more) vapor compression circuits, containing identical or distinct heat transfer compositions. For example, the vapor compression circuits may be coupled to each other.

According to the invention, the refrigerant fluid is superheated between evaporation and compression, meaning that it is brought to a temperature greater than the evaporation end temperature, between evaporation and compression.

The term "evaporation onset temperature" refers to the temperature of the refrigerant fluid at the inlet of the evaporator.

The term "evaporation end temperature" refers to the temperature of the refrigerant fluid on evaporation of the last drop of refrigerant fluid in liquid form (saturation vapor temperature or dew point).

When the refrigerant fluid is a pure body or an azeotropic mixture, the evaporation onset temperature is equal to the evaporation end temperature.

The term "average evaporation temperature" refers to the arithmetic mean between the evaporation onset temperature and the evaporation end temperature.

The term "superheating" (equivalent here to "superheating at the evaporator") denotes the temperature differential between the maximum temperature attained by the refrigerant fluid before compression (i.e., the maximum temperature attained by the refrigerant fluid at the end of the superheating step) and the evaporation end temperature. This maximum temperature is generally the temperature of the refrigerant fluid at the inlet of the compressor. It may correspond to the temperature of the refrigerant fluid at the outlet of the evaporator. Alternatively, the refrigerant fluid may be at least partially superheated between the evaporator and the compressor (by means, for example, of an internal exchanger). The superheating may be adjusted by appropriate regulation of the parameters of the installation, and especially by regulation of the expansion module. In the process of the invention, the superheating is strictly greater than 0° C.

The expansion module may be a valve which is thermostatic and called a thermostatic expander or electronic having one or more orifices, or a pressostatic expander, which regulates the pressure. It may also be a capillary tube, in which the expansion of the fluid is obtained by the loss of head in the tube. The expansion module may also be a turbine for producing mechanical work (which can be converted into electricity), or a turbine coupled directly or indirectly to the compressor.

In some embodiments, the invention envisions the replacement of an initial heat transfer composition by a replacement heat transfer composition, in the heat transfer process.

In some embodiments, this replacement may be performed by emptying, preferably entirely or essentially entirely, the initial refrigerant fluid from the installation, and by introducing the replacement refrigerant fluid in place of the initial fluid, into the installation—and without emptying (or without completely emptying) the initial lubricant. In this case, the replacement lubricant may be the initial lubricant itself.

In some embodiments, this replacement may be performed by emptying, preferably entirely or essentially entirely, the initial heat transfer composition from the installation, and by introducing the replacement heat transfer composition in place of the initial fluid, into the installation. In this case, preferably, the replacement lubricant is different from the initial lubricant.

The process implemented is considered to be the "same" process, with the initial heat transfer composition on the one hand and with the replacement heat transfer composition on the other hand.

Preferably, before and after replacement, the process therefore operates:
with the same average evaporation temperature; and
with the same average condensation temperature.

The replacement does not entail replacing the compressor, the heat exchangers, or the expansion module.

The regulation of these components may optionally be modified during the replacement, to ensure that the average evaporation and condensation temperatures remain the same.

In some embodiments, only the regulation of the expansion module is modified.

In other embodiments, no regulation is modified.

The average condensation temperature is defined as being the arithmetic mean between the condensation onset temperature (temperature of the refrigerant fluid in the condenser on appearance of the first liquid drop of refrigerant fluid, called the vapor saturation temperature or dew point) and the condensation end temperature (temperature of the refrigerant fluid on condensation of the last bubble of refrigerant fluid in gas form, called liquid saturation temperature or bubble point).

The term "subcooling" denotes the possible temperature differential (as absolute value) between the minimum temperature attained by the refrigerant fluid before expansion, and the condensation end temperature. This minimum temperature generally corresponds to the temperature of the refrigerant fluid at the inlet of the expansion module. It may correspond to the temperature of the refrigerant fluid at the outlet of the condenser. Alternatively, the refrigerant fluid may be at least partially subcooled between the condenser and the expansion module (by means, for example, of an internal exchanger).

Preferably, in the process of the invention, a subcooling (strictly greater than 0° C.) is applied, preferably a subcooling of 1 to 15° C., more preferably of 2 to 12° C. and more preferably of 5 to 10° C.

The invention is particularly useful when the average evaporation temperature is less than or equal to 10° C.; or less than or equal to 5° C.; or less than or equal to 0° C.; or less than or equal to −5° C.; or less than or equal to −10° C.

The invention is particularly useful, therefore, for the implementation of a low-temperature refrigeration process, or moderate-temperature cooling process, or moderate-temperature heating process.

In "low-temperature refrigeration" processes, the average evaporation temperature is preferably from −45° C. to −15° C., especially from −40° C. to −20° C., more particularly preferably from −35° C. to −25° C. and for example around −30° C.; and the average condensation temperature is preferably from 25° C. to 80° C., especially from 30° C. to 60° C., more particularly preferably from 35° C. to 55° C. and for example around 40° C. These processes include, especially, freezing and deep-freezing processes.

In "moderate-temperature cooling" processes, the average evaporation temperature is preferably from −20° C. to 10° C. especially from −15° C. to 5° C. more particularly preferably from −10° C. to 0° C. and for example around −5° C.; and the average condensation temperature is preferably from 25° C. to 80° C., especially from 30° C. to 60° C., more particularly preferably from 35° C. to 55° C. and for example around 50° C. These processes may especially be refrigeration or air conditioning processes.

In "moderate-temperature heating" processes, the average evaporation temperature is preferably from −20° C. to 10° C., especially from −15° C. to 5° C., more particularly preferably from −10° C. to 0° C. and for example around −5° C.; and the average condensation temperature is preferably from 25° C. to 80° C., especially from 30° C. to 60° C., more particularly preferably from 35° C. to 55° C. and for example around 50° C.

Refrigerant Fluids

When the invention is applied to the replacement of an initial heat transfer composition, the initial refrigerant fluid may be any refrigerant fluid, for example a refrigerant fluid comprising a CFC, or an HCFC, or an HFC. The initial refrigerant fluid may in particular have a GWP of greater than or equal to 150, or greater than or equal to 500, or greater than or equal to 1000.

In some embodiments, the initial refrigerant fluid comprises HFC-134a.

In some embodiments, the initial refrigerant fluid comprises at least 10% of HFC-134a, or at least 20% of HFC-134a, or at least 30% of HFC-134a, or at least 40% of HFC-134a, or at least 50% of HFC-134a, or at least 60% of HFC-134a, or at least 70% of HFC-134a, or at least 80% of HFC-134a, or at least 90% of HFC-134a, or at least 95% of HFC-134a, relative to the total mass of the initial refrigerant fluid.

In some embodiments, the initial refrigerant fluid consists essentially, or consists, of HFC-134a (apart from impurities).

In other embodiments, the initial refrigerant fluid comprises HFC-134a in a mixture with one or more heat transfer compounds, and preferably one or more hydrofluorocarbons and/or hydrocarbons.

"Hydrofluorocarbons" are understood in the context of the present patent application to be saturated hydrofluorocarbons which are not hydrofluoroolefins.

The hydrofluorocarbons may especially include difluoromethane (HFC-32), pentafluoroethane (HFC-125), 1,1,2,2-tetrafluoroethane (HFC-134), 1,1-difluoroethane (HFC-152a), fluoroethane (HFC-161), 1,1,1,2,3,3,3-heptafluoropropane (HFC-227ea), 1,1,1-trifluoropropane (HFC-263fb), and mixtures thereof.

The initial refrigerant fluid is preferably devoid of hydrofluoroolefins and hydrochlorofluoroolefins.

In some embodiments, the initial refrigerant fluid is a composition which is binary (consisting of two compounds) or ternary (consisting of three compounds) or quaternary (consisting of four compounds) or quinquenary (consisting of five compounds).

Examples of mixtures which may make up the initial refrigerant fluid are R-407A, R-407B, R-407C, R-407D, R-407E, R-407F, R-421A, R-421B, R-422A, R-422B, R-422C, R-422D, R-424A, R-425A, R-426A and R-427A.

There may or may not be impurities in such refrigerant fluids. When they are present, they may represent less than 1%, preferably less than 0.5%, preferably less than 0.1%, preferably less than 0.05% and preferably less than 0.01% (by mass) of said fluid.

The refrigerant fluid used for implementing the process of the invention, which is the replacement refrigerant fluid if replacement is performed, comprises HFO-1234yf.

In some embodiments, this refrigerant fluid comprises at least 10% of HFO-1234yf, or at least 20% of HFO-1234yf, or at least 30% of HFO-1234yf, or at least 40% of HFO-1234yf, or at least 50% of HFO-1234yf, or at least 60% of HFO-1234yf, or at least 70% of HFO-1234yf, or at least 80% of HFO-1234yf, or at least 90% of HFO-1234yf, or at least 95% of HFO-1234yf, relative to the total mass of the replacement refrigerant fluid.

In some embodiments, this refrigerant fluid consists essentially, or consists, of HFO-1234yf (apart from impurities).

In other embodiments, this refrigerant fluid comprises HFO-1234yf in a mixture with one or more hydrofluorocarbons and/or hydrofluoroolefins and/or hydrocarbons and/or hydrochlorofluoroolefins and/or $CO_2$.

The hydrofluoroolefins may especially include HFO-1234ze, in cis and/or trans form, and preferably in trans form; and trifluoroethylene (HFO-1123).

The hydrochlorofluoroolefins may especially include 1-chloro-3,3,3-trifluoropropene (HCFO-1233zd), in cis and/or trans form, and preferably in trans form.

The hydrofluorocarbons may especially include difluoromethane (HFC-32), pentafluoroethane (HFC-125), 1,1,2,2-tetrafluoroethane (HFC-134), 1,1,1,2-tetrafluoroethane (HFC-134a), 1,1-difluoroethane (HFC-152a), fluoroethane (HFC-161), 1,1,1,2,3,3,3-heptafluoropropane (HFC-227ea), 1,1,1-trifluoropropane (HFC-263fb), and mixtures thereof.

In some embodiments, this refrigerant fluid is a composition which is binary (consisting of two compounds) or ternary (consisting of three compounds) or quaternary (consisting of four compounds) or quinquenary (consisting of five compounds).

There may or may not be impurities in such refrigerant fluids. When they are present, they may represent less than 1%, preferably less than 0.5%, preferably less than 0.1%, preferably less than 0.05% and preferably less than 0.01% (by mass) of said fluid.

Besides HFO-1234yf alone (apart from impurities), refrigerant fluids which can be used for the process of the invention (and therefore, where appropriate, as replacement refrigerant fluids) are those consisting of (apart from impurities):

HFO-1234yf and HFC-32;
HFO-1234yf and HFC-152a;
HFO-1234yf and HFC-134a;
HFO-1234yf and HFC-134;
HFO-1234yf and HFO-1123;
HFO-1234yf and HFC-125;
HFO-1234yf and $CO_2$;
HFO-1234yf, HFC-32 and $CO_2$;
HFO-1234yf, HFC-32 and HFO-1123;
HFO-1234yf, HFC-125 and HFO-1123;
HFO-1234yf, HFC-134a and HFO-1123;
HFO-1234yf, HFC-134 and HFO-1123;
HFO-1234yf, HFC-32 and HFC-125;
HFO-1234yf, HFC-152a and HFC-125;
HFO-1234yf, HFC-152a and HFC-32;
HFO-1234yf, HFC-134a and HFC-152a;
HFO-1234yf, HFC-134a and HFC-32;
HFO-1234yf, HFC-134a and HFC-125;
HFO-1234yf, HFO-1234ze and HFC-134a;
HFO-1234yf, HFO-1234ze and HFC-152a;
HFO-1234yf, HFO-1234ze and HFC-134;
HFO-1234yf, HFO-1234ze and HFC-32;
HFO-1234yf, HFO-1234ze and HFC-125;
HFO-1234yf, HFC-134a, HFC-125 and HFC-32;
HFO-1234yf, HFO-1234ze, HFC-125 and HFC-32;
HFO-1234yf, HFC-152a, HFC-125 and HFC-32;
HFO-1234yf, $CO_2$, HFC-125 and HFC-32;
HFO-1234yf, HFC-134, HFC-125 and HFC-32;
HFO-1234yf, HFC-227ea, HFC-125 and HFC-32;
HFO-1234yf, HFC-134a, HFC-152a and HFC-32;
HFO-1234yf, HFC-134a, HFC-152a and HFC-125;
HFO-1234yf, HFO-1234ze, HFC-152a and HFC-32;
HFO-1234yf, HFO-1234ze, HFC-134a and HFC-32;
HFO-1234yf, HFO-1234ze, HFC-134a and HFC-152a;
HFO-1234yf, HFO-1234ze, HFC-134a and HFC-125;
HFO-1234yf, HFC-134a, HFC-152a, HFC-125 and HFC-32;
HFO-1234yf, HFC-134a, HFO-1234ze, HFC-125 and HFC-32;
HFO-1234yf, HFC-134a, HFC-227ea, HFC-125 and HFC-32;
HFO-1234yf, HFC-134a, $CO_2$, HFC-125 and HFC-32;
HFO-1234yf, HFC-134a, HFC-134, HFC-125 and HFC-32.

Preferred refrigerant fluids are especially those consisting of (apart from impurities):

HFO-1234yf and HFC-32 in respective proportions by mass of 60 to 85% and of 15 to 40%; or preferably of 63 to 79% and of 21 to 37%; or more preferably of 64 to 79% and of 21 to 36%;

HFO-1234yf and HFC-152a in respective proportions by mass of 10 to 95% and of 5 to 90%; or preferably of 50 to 95% and of 5 to 50%; or more preferably of 80 to 95% and of 5 to 20%;

HFO-1234yf and HFC-134a in respective proportions by mass of 10 to 95% and of 5 to 90%; or preferably of 40 to 60% and of 40 to 60%; or more preferably of 50 to 60% and of 40 to 50%;

HFO-1234yf and HFC-125 in respective proportions by mass of 10 to 95% and of 5 to 90%; or preferably of 50 to 95% and of 5 to 50%; or more preferably of 80 to 95% and of 5 to 20%;

HFO-1234yf, HFC-134a and HFC-152a in respective proportions by mass of 1 to 98%, of 1 to 98% and of 1 to 98%; or preferably of 50 to 98%, of 1 to 49% and of 1 to 49%; or more preferably of 56 to 80%, of 5 to 22% and of 5 to 22%.

HFO-1234yf, HFC-125 and HFC-32 in respective proportions by mass of 1 to 98%, of 1 to 98% and of 1 to 98%; or preferably of 1 to 49%, of 1 to 49% and of 50 to 98%; or more preferably of 20 to 30%, of 1 to 10% and of 60 to 75%.

HFO-1234yf, $CO_2$ and HFC-32 in respective proportions by mass of 1 to 98%, of 1 to 98% and of 1 to 98%; or preferably of 50 to 98%, of 1 to 49% and of 1 to 49%; or more preferably of 70 to 80%, of 1 to 10% and of 5 to 22%.

In some embodiments, the refrigerant fluid of the invention (where appropriate, replacement refrigerant fluid) consists of (apart from impurities): from 74 to 81.5% (preferably from 75.5 to 79.5%) of HFO-1234yf, from 12 to 16% of HFC-152a, and from 6.5 to 10.5% of HFC-134a (by mass). A refrigerant fluid of this kind has the advantage of being azeotropic.

In some embodiments, the refrigerant fluid of the invention (where appropriate, replacement refrigerant fluid) consists of (apart from impurities) approximately 77.5% of HFO-1234yf, approximately 14% of HFC-152a and approximately 8.5% of HFC-134a (by mass). A refrigerant fluid of this kind has the advantage of being azeotropic.

In some embodiments, the refrigerant fluid of the invention (where appropriate, replacement refrigerant fluid) consists of (apart from impurities) approximately 77.5% of HFO-1234yf, approximately 16% of HFC-152a and approximately 6.5% of HFC-134a (by mass). A refrigerant fluid of this kind has the advantage of being azeotropic.

In some embodiments, the refrigerant fluid of the invention (where appropriate, replacement refrigerant fluid) consists of (apart from impurities) approximately 81.5% of HFO-1234yf, approximately 12% of HFC-152a and approximately 6.5% of HFC-134a (by mass). A refrigerant fluid of this kind has the advantage of being azeotropic.

In some embodiments, the refrigerant fluid of the invention (where appropriate, replacement refrigerant fluid) consists of (apart from impurities) approximately 75.5% of HFO-1234yf, approximately 14.5% of HFC-152a and approximately 10% of HFC-134a (by mass). A refrigerant fluid of this kind has the advantage of being azeotropic.

In some embodiments, the refrigerant fluid of the invention (where appropriate, replacement refrigerant fluid) consists of (apart from impurities) approximately 77.5% of HFO-1234yf, approximately 12% of HFC-152a and approximately 10.5% of HFC-134a (by mass). A refrigerant fluid of this kind has the advantage of being azeotropic.

The GWP of the refrigerant fluid used in the process of the invention (which, where appropriate, is the replacement refrigerant fluid) is preferably less than 1000, more preferably less than 500, or than 150, or than 100, or than 50, or than 25.

When replacement is performed, preferably, the GWP of the replacement refrigerant fluid is less than the GWP of the initial refrigerant fluid.

The GWP is defined with respect to carbon dioxide and with respect to a period of time of 100 years, according to the method shown in "*The Scientific Assessment of Ozone Depletion, 2002, A Report of the World Meteorological Association's Global Ozone Research and Monitoring Project*".

When replacement is performed, in some embodiments, HFC-134a (alone) is replaced by HFO-1234yf (alone).

When replacement is performed, in some embodiments, an initial refrigerant fluid comprising HFC-134a in a mixture with one or more other compounds is replaced by a replacement refrigerant fluid comprising HFO-1234yf in a mixture with the same other compound or compounds.

Preferably, if HFC-134a is present in the replacement refrigerant fluid, the proportion by mass of HFC-134a in the replacement refrigerant fluid is less than the proportion by mass of HFC-134a in the initial refrigerant fluid.

Preferably, if one or more hydrofluorocarbons are present in the replacement refrigerant fluid, the proportion by mass of the collective of the hydrofluorocarbons in the replacement refrigerant fluid is less than the proportion by mass of the collective of the hydrofluorocarbons in the initial refrigerant fluid.

Lubricant

The heat transfer composition used for implementing the process comprises a lubricant (referred to as replacement lubricant when replacement is performed).

This lubricant comprises a POE. The lubricant preferably is a POE. Alternatively, consideration may be given to a mixture of POE and another product such as, for example, a PAG.

In the text above, "a POE" refers either to a single POE or, preferably, to a mixture of a plurality of POEs.

A POE may be obtained by reacting at least one polyol (that is to say, a compound containing at least two OH groups) with at least one carboxylic acid.

The POEs which may be used in the present invention comprise POEs of types A, B, C and D, which are described in more detail below.

The POEs of type A conform to the following formula (I):

$$R^1[OC(O)R^2]_n \qquad (I)$$

in which:
R$^1$ is a linear or branched hydrocarbon-based radical, optionally substituted by at least one hydroxyl group and/or comprising at least one heteroatom selected from the group consisting of O, N and S;
each R$^2$ is, independently, selected from the group consisting of: i) H; ii) an aliphatic hydrocarbon-based radical; iii) a branched hydrocarbon-based radical; iv) a mixture of a radical ii) and/or iii) with an aliphatic hydrocarbon-based radical comprising from 8 to 14 carbon atoms; and
n is an integer of at least 2.

In the context of the invention, a "hydrocarbon-based radical" refers to a radical composed of carbon and hydrogen atoms.

In some embodiments, the polyols used for obtaining the POEs of type A conform to the following formula (II):

$$R^1(OH)_n \qquad (II)$$

in which:
R$^1$ is a linear or branched hydrocarbon-based radical, optionally substituted by at least one hydroxyl group, preferably by two hydroxyl groups, and/or comprising at least one heteroatom selected from the group consisting of O, N and S; and
n is an integer of at least 2.

In some embodiments, R$^1$ is a linear or branched hydrocarbon-based radical comprising from 4 to 40 carbon atoms, preferably from 4 to 20 carbon atoms.

In some embodiments, R$^1$ is a linear or branched hydrocarbon-based radical comprising at least one oxygen atom.

In some embodiments, R$^1$ is a branched hydrocarbon-based radical comprising from 4 to 10 carbon atoms, preferably 5 carbon atoms, which is substituted by two hydroxyl groups.

In some embodiments, the polyols comprise from 2 to 10 hydroxyl groups, preferably from 2 to 6 hydroxyl groups.

The polyols may comprise one or more oxyalkylene groups; in this particular case, they are polyether polyols.

The polyols may also comprise one or more nitrogen atoms. For example, the polyols may be alkanolamines containing from 3 to 6 hydroxyl groups. In some embodiments, the polyols are alkanolamines containing at least two hydroxyl groups, and preferably at least three.

In some embodiments, the polyols are selected from the group consisting of ethylene glycol, diethylene glycol, triethylene glycol, propylene glycol, dipropylene glycol, glycerol, neopentyl glycol, 1,2-butanediol, 1,4-butanediol, 1,3-butanediol, pentaerythritol, dipentaerythritol, tripentaerythritol, triglycerol, trimethylolpropane, sorbitol, hexaglycerol, and mixtures thereof.

In some embodiments, the carboxylic acids used for obtaining the POEs of type A conform to the following formula (III):

$$R^2COOH \qquad (III)$$

in which:
R$^2$ is selected from the group consisting of: i) H; ii) an aliphatic hydrocarbon-based radical; iii) a branched hydrocarbon-based radical; iv) a mixture of a radical ii) and/or iii) with an aliphatic hydrocarbon-based radical comprising from 8 to 14 carbon atoms.

In some embodiments, R$^2$ is an aliphatic hydrocarbon-based radical comprising from 1 to 10, preferentially from 1 to 7, carbon atoms, and in particular from 1 to 6 carbon atoms.

In some embodiments, R$^2$ is a branched hydrocarbon-based radical comprising from 4 to 20 carbon atoms, in particular from 5 to 14 carbon atoms, and preferentially from 6 to 8 carbon atoms.

In some embodiments, a branched hydrocarbon-based radical as mentioned above conforms to the following formula (IV):

$$-C(R^3)(R^4)(R^5) \qquad (IV)$$

in which R$^3$, R$^4$ and R$^5$ are, independently of one other, an alkyl group, and at least one of the alkyl groups contains at minimum two carbon atoms. Branched alkyl groups of this kind, once bonded to the carboxyl group, are known under the name "neo group", and the corresponding acid is known as a "neo acid". Preferably, R$^3$ and R$^4$ are methyl groups and R$^5$ is an alkyl group comprising at least two carbon atoms.

The radical $R^2$ may comprise one or more carboxyl groups, or ester groups such as —COOR$^6$, with $R^6$ representing an alkyl or hydroxyalkyl radical or a hydroxyalkyloxyalkyl group.

In some embodiments, the acid $R^2$COOH of formula (III) is a monocarboxylic acid.

Examples of carboxylic acids in which the hydrocarbon-based radical is aliphatic are especially: formic acid, acetic acid, propionic acid, butyric acid, pentanoic acid, hexanoic acid and heptanoic acid.

Examples of carboxylic acids in which the hydrocarbon-based radical is branched are especially: 2-ethyl-n-butyric acid, 2-hexyldecanoic acid, isostearic acid, 2-methylhexanoic acid, 2-methylbutanoic acid, 3-methylbutanoic acid, 3,5,5-trimethylhexanoic acid, 2-ethylhexanoic acid, neoheptanoic acid, and neodecanoic acid.

Other carboxylic acids which can be used in the preparation of the POEs of type A are carboxylic acids comprising an aliphatic hydrocarbon-based radical comprising from 8 to 14 carbon atoms. Examples include: decanoic acid, dodecanoic acid, lauric acid, stearic acid, myristic acid, behenic acid, etc. The dicarboxylic acids may include maleic acid, succinic acid, adipic acid, sebacic acid, etc.

In some embodiments, the carboxylic acids used for preparing the POEs of type A comprise a mixture of monocarboxylic and dicarboxylic acids, the proportion of monocarboxylic acids being predominant. The presence of dicarboxylic acids results especially in the formation of POEs of high viscosity.

In particular, the reaction which forms the POEs of type A by reaction between the carboxylic acid and the polyols is a reaction catalyzed by an acid. It is especially a reversible reaction, which may be completed by the use of a large amount of acid or by the elimination of the water formed during the reaction. The esterification reaction may be carried out in the presence of organic or inorganic acids, such as sulfuric acid, phosphoric acid, etc.

In some embodiments, the reaction is carried out in the absence of catalyst.

The amount of carboxylic acid and of polyol may vary in the mixture depending on the desired results. In the particular case in which all the hydroxyl groups are esterified, a sufficient amount of carboxylic acid must be added to react with all the hydroxyls.

In some embodiments, when using mixtures of carboxylic acids, these acids may react sequentially with the polyols.

In some embodiments, when using a mixture of carboxylic acids, a polyol reacts first with a carboxylic acid, typically the carboxylic acid with the highest molecular weight, followed by reaction with the carboxylic acid having an aliphatic hydrocarbon-based chain.

In some embodiments, the esters may be formed by reaction between the carboxylic acids (or their anhydride or ester derivatives) and the polyols, in the presence of acids at high temperature, with removal of the water formed during the reaction. Typically, the reaction may be performed at a temperature of from 75 to 200° C.

In some embodiments, the POEs formed may comprise hydroxyl groups which have not all reacted; in this case, they are partially esterified POEs.

In some embodiments, the POEs are obtained from pentaerythritol alcohol and from a mixture of carboxylic acids: isononanoic acid, at least one acid having an aliphatic hydrocarbon-based radical comprising from 8 to 10 carbon atoms, and heptanoic acid. The preferred polyol esters are obtained from pentaerythritol and from a mixture of 70% isononanoic acid, 15% of at least one carboxylic acid having an aliphatic hydrocarbon-based radical comprising from 8 to 10 carbon atoms, and 15% heptanoic acid. Mention may for example be made of the oil Solest 68 sold by CPI Engineering Services Inc.

The POEs of type B comprise at least one ester of one or more branched carboxylic acids comprising not more than 8 carbon atoms. The ester is especially obtained by reaction of said branched carboxylic acid with one or more polyols.

Preferably, the branched carboxylic acid comprises at least 5 atoms of carbon. In particular, the branched carboxylic acid comprises from 5 to 8 carbon atoms, and it preferentially contains 5 carbon atoms.

Preferably, the abovementioned branched carboxylic acid does not comprise 9 carbon atoms. In particular, said carboxylic acid is not 3,5,5-trimethylhexanoic acid.

In some embodiments, the branched carboxylic acid is selected from 2-methylbutanoic acid, 3-methylbutanoic acid, and mixtures thereof.

In some embodiments, the polyol is selected from the group consisting of neopentyl glycol, glycerol, trimethylolpropane, pentaerythritol, dipentaerythritol, tripentaerythritol, and mixtures thereof.

In some embodiments, the POEs are obtained from:

i) a carboxylic acid selected from 2-methylbutanoic acid, 3-methylbutanoic acid, and mixtures thereof; and ii) a polyol selected from the group consisting of neopentyl glycol, glycerol, trimethylolpropane, pentaerythritol, dipentaerythritol, tripentaerythritol, and mixtures thereof.

In some embodiments, the POE is the one obtained from:

2-methylbutanoic acid and pentaerythritol;

2-methylbutanoic acid and dipentaerythritol;

3-methylbutanoic acid and pentaerythritol;

3-methylbutanoic acid and dipentaerythritol; or 2-methylbutanoic acid and neopentyl glycol.

The POEs of type C are poly(neopentyl polyol) esters obtained by:

i) reaction of a neopentyl polyol having the following formula (V):

in which:

each R represents, independently, $CH_3$, $C_2H_5$ or $CH_2OH$;

p is an integer ranging from 1 to 4;

with at least one monocarboxylic acid having from 2 to 15 carbon atoms, and in the presence of an acid catalyst, the molar ratio of the carboxyl groups to the hydroxyl groups being less than 1:1, to form a partially esterified poly (neopentyl polyol) composition; and ii) reaction of the partially esterified poly(neopentyl polyol) composition obtained at the end of step i) with another carboxylic acid having from 2 to 15 carbon atoms, to form the final poly(neopentyl polyol) ester composition.

Preferably, reaction i) is performed with a molar ratio ranging from 1:4 to 1:2.

Preferably, the neopentyl polyol has the following formula (VI):

(VI)

in which each R represents, independently of each other, $CH_3$, $C_2H_5$ or $CH_2OH$.

Preferred neopentyl polyols are those chosen from pentaerythritol, dipentaerythritol, tripentaerythritol, tetraerythritol, trimethylolpropane, trimethylolethane, and neopentyl glycol. In particular, the neopentyl polyol is dipentaerythritol.

Preferably, a single neopentyl polyol is used to produce the lubricant. In some cases, two or more neopentyl polyols are used. This is notably the case when a commercial pentaerythritol product comprises small amounts of dipentaerythritol, tripentaerythritol and tetraerythritol.

In some embodiments, the abovementioned monocarboxylic acid comprises from 5 to 11 carbon atoms, preferably from 6 to 10 carbon atoms.

The monocarboxylic acids notably have the following general formula (VII):

R'C(O)OH    (VII)

in which R' is a linear or branched C1-C12 alkyl radical, a C6-C12 aryl radical or a C6-C30 aralkyl radical. Preferably, R' is a C4-C10, preferentially C5-C9, alkyl radical.

In particular, the monocarboxylic acid may be selected from the group consisting of butanoic acid, pentanoic acid, hexanoic acid, heptanoic acid, n-octanoic acid, n-nonanoic acid, n-decanoic acid, 3-methylbutanoic acid, 2-methylbutanoic acid, 2,4-dimethylpentanoic acid, 2-ethylhexanoic acid, 3,3,5-trimethylhexanoic acid, benzoic acid, and mixtures thereof.

In some embodiments, the monocarboxylic acid is n-heptanoic acid or a mixture of n-heptanoic acid with another linear monocarboxylic acid, in particular n-octanoic and/or n-decanoic acid.

A monocarboxylic acid mixture of this kind may especially comprise between 15 and 100 mol % of heptanoic acid and between 0 and 85 mol % of other monocarboxylic acid(s). In particular, the mixture may comprise between 75 and 100 mol % of heptanoic acid, and between 0 and 25 mol % of a mixture of octanoic acid and decanoic acid in a molar ratio of 3:2.

In some embodiments, the POEs comprise:
i) from 45 to 55% by mass of an ester of monopentaerythritol with at least one monocarboxylic acid having from 2 to 15 carbon atoms;
ii) less than 13% by mass of an ester of dipentaerythritol with at least one monocarboxylic acid having from 2 to 15 carbon atoms;
iii) less than 10% by mass of an ester of tripentaerythritol with at least one monocarboxylic acid having from 2 to 15 carbon atoms; and
iv) at least 25% by mass of an ester of tetraerythritol and of other oligomers of pentaerythritol, with at least one monocarboxylic acid having from 2 to 15 carbon atoms.

In some embodiments, the POEs comprise, by mass, from 0 to 5%, or from 5 to 10%, or from 10 to 15%, or from 15 to 20%, or from 20 to 25%, or from 25 to 30%, or from 30 to 35%, or from 35 to 40%, or from 40 to 45%, or from 45 to 50%, or from 50 to 55%, or from 55 to 60%, or from 60 to 65%, or from 65 to 70%, or from 70 to 75%, or from 75 to 80%, or from 80 to 85%, or from 85 to 90%, or from 90 to 95%, or from 95 to 100%, of an ester of monopentaerythritol with at least one monocarboxylic acid containing from 2 to 15 carbon atoms.

The POEs of type D conform to the following formula (VIII):

in which:
$R^7$, $R^8$, $R^9$, $R^{10}$, $R^{11}$ and $R^{12}$ are, independently of each other, H or $CH_3$;
a, b, c, y, x and z are, independently of each other, an integer;
a+x, b+y and c+z are, independently of each other, integers ranging from 1 to 20;
$R^{13}$, $R^{14}$ and $R^{15}$ are, independently of each other, selected from the group consisting of alkyls, which are aliphatic or branched, alkenyls, cycloalkyls, aryls, alkylaryls, arylalkyls, alkylcycloalkyls, cycloalkylalkyls, arylcycloalkyls, cycloalkylaryls, alkylcycloalkylaryls, alkylarylcycloalkyls, arylcycloalkylalkyls, arylalkylcycloalkyls, cycloalkylalkylaryls and cycloalkylarylalkyls, where $R^{13}$, $R^{14}$ and $R^{15}$ have from 1 to 17 carbon atoms and may be optionally substituted.

In some embodiments, each of $R^{13}$, $R^{14}$ and $R^{15}$ represents, independently of each other, a linear or branched alkyl group, an alkenyl group or a cycloalkyl group, it being possible for said alkyl, alkenyl or cycloalkyl groups to comprise at least one heteroatom selected from N, O, Si, F or S. Preferably, each of $R^{13}$, $R^{14}$ and $R^{15}$, independently of each other, has from 3 to 8 carbon atoms, preferably from 5 to 7 carbon atoms.

Preferably, a+x, b+y and c+z are, independently of each other, integers ranging from 1 to 10, preferentially from 2 to 8, and even more preferentially from 2 to 4.

Preferably, $R^7$, $R^8$, $R^9$, $R^{10}$, $R^{11}$ and $R^{12}$ represent H.

The POEs of formula (VIII) above may typically be prepared as described in paragraphs [0027] to [0030] of international patent application WO 2012/177742.

In particular, the POEs of formula (VIII) may be obtained by esterification of glycerol alkoxylates (as described in paragraph [0027] of WO 2012/177742) with one or more monocarboxylic acids having from 2 to 18 carbon atoms.

In some embodiments, the monocarboxylic acids have one of the following formulae: $R^{13}COOH$, $R^{14}COOH$ and $R^{15}COOH$, in which $R^{13}$, $R^{14}$ and $R^{15}$ are as defined above.

Derivatives of carboxylic acids may also be used, such as anhydrides, esters and acyl halides.

The esterification may be carried out with one or more monocarboxylic acids. Preferred monocarboxylic acids are those selected from the group consisting of acetic acid, propanoic acid, butyric acid, isobutanoic acid, pivalic acid, pentanoic acid, isopentanoic acid, hexanoic acid, heptanoic acid, octanoic acid, 2-ethylhexanoic acid, 3,3,5-trimethylhexanoic acid, nonanoic acid, decanoic acid, neodecanoic acid, undecanoic acid, dodecanoic acid, tridecanoic acid, myristic acid, pentadecanoic acid, palmitic acid, stearic acid, oleic acid, linoleic acid, palmitoleic acid, citronellic acid, undecenoic acid, lauric acid, undecylenic acid, linolenic acid, arachidic acid, behenic acid, tetrahydrobenzoic acid, hydrogenated or non-hydrogenated abietic acid, 2-ethylhexanoic acid, furoic acid, benzoic acid, 4-acetylbenzoic acid, pyruvic acid, 4-tert-butylbenzoic acid, naphthenic acid, 2-methylbenzoic acid, salicylic acid, isomers thereof, methyl esters thereof, and mixtures thereof.

In some embodiments, the esterification is carried out with one or more monocarboxylic acids selected from the group consisting of pentanoic acid, 2-methylbutanoic acid, n-hexanoic acid, n-heptanoic acid, 3,3,5-trimethylhexanoic acid, 2-ethylhexanoic acid, n-octanoic acid, n-nonanoic acid and isononanoic acid.

Preferably, the esterification is carried out with one or more monocarboxylic acids selected from the group consisting of butyric acid, isobutyric acid, n-pentanoic acid, 2-methylbutanoic acid, 3-methylbutanoic acid, n-hexanoic acid, n-heptanoic acid, n-octanoic acid, 2-ethylhexanoic acid, 3,3,5-trimethylhexanoic acid, n-nonanoic acid, decanoic acid, undecanoic acid, undecylenic acid, lauric acid, stearic acid, isostearic acid, and mixtures thereof.

In some embodiments, the POEs have the following formula (IX):

(IX)

in which:
each of $R^{17}$ and $R^{18}$ is, independently of each other, H or $CH_3$;
each of m and n is, independently of each other, an integer, with m+n being an integer ranging from 1 to 10;
$R^{16}$ and $R^{19}$ are, independently of each other, selected from the group consisting of alkyls, which are aliphatic or branched, alkenyls, cycloalkyls, aryls, alkylaryls, arylalkyls, alkylcycloalkyls, cycloalkylalkyls, arylcycloalkyls, cycloalkylaryls, alkylcycloalkylaryls, alkylarylcycloalkyls, arylcycloalkylalkyls, arylalkylcycloalkyls, cycloalkylalkylaryls and cycloalkylarylalkyls, where $R^{16}$ and $R^{19}$ have from 1 to 17 carbon atoms and may be optionally substituted.

In some embodiments, each of $R^{16}$ and $R^{19}$ represents, independently of each other, a linear or branched alkyl group, an alkenyl group or a cycloalkyl group, it being possible for said alkyl, alkenyl or cycloalkyl groups to comprise at least one heteroatom selected from N, O, Si, F or S. Preferably, each of $R^{16}$ and $R^{19}$ contains, independently of each other, from 3 to 8 carbon atoms, preferably from 5 to 7 carbon atoms.

In some embodiments, each of $R^{17}$ and $R^{18}$ represents H, and/or m+n is an integer ranging from 2 to 8, from 4 to 10, from 2 to 5, or from 3 to 5. In particular, m+n has the value 2, 3 or 4.

In some embodiments, the POEs of formula (IX) above are diesters of triethylene glycol or diesters of tetraethylene glycol, in particular with one or two monocarboxylic acids having from 4 to 9 carbon atoms.

The POEs of formula (IX) above may be prepared by esterification of an ethylene glycol, of a propylene glycol or of an oligo- or polyalkylene glycol (which may be an oligo- or polyethylene glycol, oligo- or polypropylene glycol or an ethylene glycol-propylene glycol block copolymer) with one or two monocarboxylic acids having from 2 to 18 carbon atoms. The esterification may be carried out identically to the esterification reaction carried out for preparing the POEs of formula (VIII) above.

In particular, monocarboxylic acids identical to those used to prepare the POEs of formula (VIII) above may be used to form the POEs of formula (IX).

In some embodiments, the lubricant comprises from 20 to 80%, preferably from 30 to 70%, and preferentially from 40 to 60%, by mass of at least one POE of formula (VIII) and from 80 to 20%, preferably from 70 to 30%, and preferentially from 60 to 40%, by mass of at least one POE of formula (IX).

Generally, some alcohol functions may not be esterified during the esterification reaction; however, the proportion thereof remains low. Thus, the POEs may comprise between 0 relative mol % and 5 relative mol % of $CH_2OH$ units, relative to the —$CH_2$—O—C(=O)— units.

The lubricant used in the process of the invention is such that the solubility of HFO-1234yf in this lubricant is less than the solubility of HFC-134a in the lubricant.

The "solubility" of a compound A in the lubricant refers to the maximum proportion by mass of compound A in the gaseous state that can be absorbed by the lubricant in liquid phase (that is to say, the maximum relative proportion by mass of compound A in the lubricant in liquid phase when the lubricant is contacted with the compound A in the gaseous state). The solubility may be measured as described below in example 1.

The solubility condition above is verified at a temperature of 0° C. and at a pressure which is:
2.2 bar abs for HFO-1234yf; and
2.0 bar abs for HFC-134a.

These pressure values correspond to the vapor saturation pressure respectively of HFO-1234yf and of HFC-134a at the temperature of −10° C.

When replacement is performed, the replacement lubricant may be identical to the initial lubricant or different from the latter.

The initial lubricant may be of any type. It may especially be selected from mineral oils, silicone oils, paraffins which are natural or synthetic, naphthenes, alkylbenzenes, poly-alpha-olefins, polyalkene glycols (PAGs), polyol esters (POEs), polyvinyl ethers and mixtures thereof.

The initial lubricant preferably comprises a POE or is a POE.

The detailed description of the types of possible POEs above applies equally to the initial lubricant when the latter comprises a POE or is a POE.

Additives

The additives which may be present in the heat transfer composition of the invention may especially be selected from nanoparticles, stabilizers, surfactants, tracer agents, fluorescent agents, odorants and solubilizers.

Preferably, the additives are not lubricants.

The stabilizer(s), when they are present, preferably represent at most 5% by mass in the heat transfer composition. Among the stabilizers, mention may especially be made of nitromethane, ascorbic acid, terephthalic acid, azoles such as tolutriazole or benzotriazole, phenolic compounds such as tocopherol, hydroquinone, t-butyl hydroquinone, 2,6-di-tert-butyl-4-methylphenol, epoxides (alkyl which is optionally fluorinated or perfluorinated or alkenyl or aromatic) such as n-butyl glycidyl ether, hexanediol diglycidyl ether, allyl glycidyl ether, butylphenyl glycidyl ether, phosphites, phosphonates, thiols and lactones.

Nanoparticles which may be used include, especially, carbon nanoparticles, metal (copper, aluminum) oxides, $TiO_2$, $Al_2O_3$, $MoS_2$, etc.

As tracer agents (capable of being detected), mention may be made of deuterated or non-deuterated hydrofluorocarbons, deuterated hydrocarbons, perfluorocarbons, fluoroethers, brominated compounds, iodinated compounds, alcohols, aldehydes, ketones, nitrous oxide and combinations thereof. The tracer agent is different from the compounds making up the refrigerant fluid.

As solubilizers, mention may be made of hydrocarbons, dimethyl ether, polyoxyalkylene ethers, amides, ketones, nitriles, chlorocarbons, esters, lactones, aryl ethers, fluoroethers and 1,1,1-trifluoroalkanes. The solubilizer is different from the heat transfer compound or compounds forming the refrigerant fluid.

As fluorescent agents, mention may be made of naphthalimides, perylenes, coumarins, anthracenes, phenanthracenes, xanthenes, thioxanthenes, naphthoxanthenes, fluoresceins and derivatives and combinations thereof.

As odorants, mention may be made of alkyl acrylates, allyl acrylates, acrylic acids, acryl esters, alkyl ethers, alkyl esters, alkynes, aldehydes, thiols, thioethers, disulfides, allyl isothiocyanates, alkanoic acids, amines, norbornenes, norbornene derivatives, cyclohexene, aromatic heterocyclic compounds, ascaridole, o-methoxy(methyl)phenol and the combinations thereof.

When replacement is performed, the additives described above may be present in the initial heat transfer composition and/or in the replacement heat transfer composition. Preferably, the same additives are present in the initial heat transfer composition and in the replacement heat transfer composition.

Formulation of Heat Transfer Compositions

In each heat transfer composition described here (where appropriate, the initial heat transfer composition on the one hand and the replacement heat transfer composition on the other hand), the proportion by mass of refrigerant fluid may represent especially from 1 to 5% of the composition; or from 5 to 10% of the composition; or from 10 to 15% of the composition; or from 15 to 20% of the composition; or from 20 to 25% of the composition; or from 25 to 30% of the composition; or from 30 to 35% of the composition; or from 35 to 40% of the composition; or from 40 to 45% of the composition; or from 45 to 50% of the composition; or from 50 to 55% of the composition; or from 55 to 60% of the composition; or from 60 to 65% of the composition; or from 65 to 70% of the composition; or from 70 to 75% of the composition; or from 75 to 80% of the composition; or from 80 to 85% of the composition; or from 85 to 90% of the composition; or from 90 to 95% of the composition; or from 95 to 99% of the composition.

In the present description, when a number of possible ranges are envisaged, the ranges resulting from the combination thereof are also covered: for example, the proportion by mass of refrigerant fluid in the heat transfer composition may be from 50 to 55%, and from 55 to 60%, i.e., from 50 to 60%, etc.

The heat transfer composition of the invention (which, where appropriate, is a replacement heat transfer composition), preferably comprises at least 50% by mass of refrigerant fluid, and in particular from 50% to 95% by mass.

Where appropriate, the initial heat transfer composition preferably comprises at least 50% by mass of refrigerant fluid, and in particular from 50% to 95% by mass.

In each heat transfer composition described here (where appropriate, the initial heat transfer composition on the one hand and the replacement heat transfer composition on the other hand), the proportion by mass of lubricant may represent especially from 1 to 5% of the composition; or from 5 to 10% of the composition; or from 10 to 15% of the composition; or from 15 to 20% of the composition; or from 20 to 25% of the composition; or from 25 to 30% of the composition; or from 30 to 35% of the composition; or from 35 to 40% of the composition; or from 40 to 45% of the composition; or from 45 to 50% of the composition; or from 50 to 55% of the composition; or from 55 to 60% of the composition; or from 60 to 65% of the composition; or from 65 to 70% of the composition; or from 70 to 75% of the composition; or from 75 to 80% of the composition; or from 80 to 85% of the composition; or from 85 to 90% of the composition; or from 90 to 95% of the composition; or from 95 to 99% of the composition.

The additives represent preferably from 0 to 30%, more preferably from 0 to 20%, more preferably from 0 to 10%, more preferably from 0 to 5%, and more preferably from 0 to 2% of each heat transfer composition, in proportions by mass.

Adaptation of the Superheatinq and/or of the Viscosity

The superheating in the heat transfer process of the invention (implemented, where appropriate, with the replacement heat transfer composition, when replacement is performed) may be especially from 1 to 2° C.; or from 2 to 3° C.; or from 3 to 4° C.; or from 4 to 5° C.; or from 5 to 7° C.; or from 7 to 10° C.; or from 10 to 15° C.; or from 15 to 20° C.; or from 20 to 25° C.; or from 25 to 30° C.; or from 30 to 50° C.

Superheating ranges from 1 to 20° C., from 2 to 10° C. and from 3 to 5° C. are examples of preferred ranges.

When replacement is performed, the superheating in the same heat transfer process implemented with the initial heat transfer composition may be especially from 1 to 2° C.; or from 2 to 3° C.; or from 3 to 4° C.; or from 4 to 5° C.; or from 5 to 7° C.; or from 7 to 10° C.; or from 10 to 15° C.; or from 15 to 20° C.; or from 20 to 25° C.; or from 25 to 30° C.; or from 30 to 50° C.

Superheating ranges from 1 to 20° C., from 2 to 10° C. and from 3 to 5° C. are examples of preferred ranges.

In some embodiments, when replacement is performed, the superheating is regulated essentially at the same value, by appropriate adjustment of the parameters of the installation and especially of the expansion module.

In other embodiments, when replacement is performed, the superheating is decreased on replacement of the heat transfer composition, by appropriate adjustment of the parameters of the installation and especially of the expansion module.

Therefore, the difference between the superheating when the process is implemented with the initial heat transfer composition and the superheating when the process is implemented, according to the invention, with the replacement heat transfer composition may especially be as follows: from 1 to 2° C.; or from 2 to 3° C.; or from 3 to 4° C.; or from 4 to 5° C.; or from 5 to 6° C.; or from 6 to 7° C.; or from 7 to 8° C.; or from 8 to 9° C.; or from 9 to 10° C. or from 10 to 15° C.; or more than 15° C.

The lubricant used in the process of the invention (which, where appropriate, is the replacement lubricant, when replacement is performed) preferably has a viscosity of 1 to 1000 centiStokes (cSt or mm²/s).

All of the viscosity values refer to the kinematic viscosity, measured at a temperature of 40° C., according to the standard DIN EN ISO 3104.

This lubricant may therefore have a viscosity of 1 to 5 cSt, or of 5 to 10 cSt, or of 10 to 20 cSt, or of 20 to 30 cSt, or of 30 to 40 cSt, or of 40 to 50 cSt, or of 50 to 60 cSt, or of 60 to 70 cSt, or of 70 to 80 cSt, or of 80 to 90 cSt, or of 90 to 100 cSt, or of 100 to 150 cSt, or of 150 to 200 cSt, or of 200 to 250 cSt, or of 250 to 300 cSt, or of 300 to 400 cSt, or of 400 to 500 cSt, or of 500 to 600 cSt, or of 600 to 700 cSt, or of 700 to 800 cSt, or of 800 to 900 cSt, or of 900 to 1000 cSt.

Examples of preferred ranges are from 10 to 200 cSt, or from 20 to 100 cSt, or from 30 to 80 cSt.

When replacement is performed, the initial lubricant may also have a viscosity of 1 to 5 cSt, or of 5 to 10 cSt, or of 10 to 20 cSt, or of 20 to 30 cSt, or of 30 to 40 cSt, or of 40 to 50 cSt, or of 50 to 60 cSt, or of 60 to 70 cSt, or of 70 to 80 cSt, or of 80 to 90 cSt, or of 90 to 100 cSt, or of 100 to 150 cSt, or of 150 to 200 cSt, or of 200 to 250 cSt, or of 250 to 300 cSt, or of 300 to 400 cSt, or of 400 to 500 cSt, or of 500 to 600 cSt, or of 600 to 700 cSt, or of 700 to 800 cSt, or of 800 to 900 cSt, or of 900 to 1000 cSt.

Examples of preferred ranges are from 10 to 200 cSt, or from 20 to 100 cSt, or from 30 to 80 cSt.

The viscosity of the lubricant is advantageously adapted depending on the type of heat transfer process implemented and on the compressor used.

In some embodiments, the heat transfer process is a refrigeration process implemented in a refrigerator; in such a case, the viscosity of the lubricant is preferably from 2 to 60 cSt, more preferably from 5 to 50 cSt and more preferably from 10 to 40 cSt. When replacement is performed, these ranges apply to the initial lubricant and/or to the replacement lubricant. When replacement is performed, HFC-134a is preferably used as initial refrigerant fluid.

In some embodiments, the heat transfer process is implemented with a hermetic or semi-hermetic compressor; in such a case, the viscosity of the lubricant is preferably from 5 to 100 cSt, more preferably from 10 to 80 cSt and more preferably from 20 to 70 cSt. When replacement is performed, these ranges apply to the initial lubricant and/or to the replacement lubricant. When replacement is performed, HFC-134a is preferably used as initial refrigerant fluid.

In some embodiments, the heat transfer process is implemented with an open compressor; in such a case, the viscosity of the lubricant is preferably from 10 to 200 cSt, more preferably from 20 to 150 cSt and more preferably from 30 to 100 cSt. When replacement is performed, these ranges apply to the initial lubricant and/or to the replacement lubricant. When replacement is performed, HFC-134a is preferably used as initial refrigerant fluid.

In some embodiments, the heat transfer process is implemented with a screw compressor; in such a case, the viscosity of the lubricant is preferably from 50 to 500 cSt, more preferably from 80 to 400 cSt and more preferably from 100 to 300 cSt. When replacement is performed, these ranges apply to the initial lubricant and/or to the replacement lubricant. When replacement is performed, HFC-134a is preferably used as initial refrigerant fluid.

In some embodiments, the heat transfer process is an automotive air conditioning process; in such a case, the viscosity of the lubricant is preferably from 20 to 200 cSt, more preferably from 35 to 150 cSt and more preferably from 50 to 100 cSt. When replacement is performed, these ranges apply to the initial lubricant and/or to the replacement lubricant. When replacement is performed, HFC-134a is preferably used as initial refrigerant fluid.

In some embodiments, the heat transfer process is a stationary air conditioning process for a dwelling, and the compressor used is a reciprocating compressor or a rotary compressor; in such a case, the viscosity of the lubricant is preferably from 5 to 120 cSt, more preferably from 10 to 100 cSt and more preferably from 20 to 70 cSt. When replacement is performed, these ranges apply to the initial lubricant and/or to the replacement lubricant. When replacement is performed, HFC-134a is preferably used as initial refrigerant fluid.

In some embodiments, the heat transfer process is a refrigeration or air conditioning process for industrial or commercial premises, and the compressor used is a reciprocating compressor or a centrifugal compressor; in such a case, the viscosity of the lubricant is preferably from 5 to 600 cSt, more preferably from 10 to 500 cSt and more preferably from 20 to 400 cSt. When replacement is performed, these ranges apply to the initial lubricant and/or to the replacement lubricant. When replacement is performed, HFC-134a is preferably used as initial refrigerant fluid.

In some embodiments, the heat transfer process is a refrigeration or air conditioning process for industrial or commercial premises, and the compressor used is a screw compressor; in such a case, the viscosity of the lubricant is preferably from 20 to 600 cSt, more preferably from 30 to 500 cSt and more preferably from 40 to 400 cSt. When replacement is performed, these ranges apply to the initial lubricant and/or to the replacement lubricant. When replacement is performed, HFC-134a is preferably used as initial refrigerant fluid.

In some embodiments, the heat transfer process is a refrigeration or air conditioning process for industrial or commercial premises, and the compressor used is a scroll compressor; in such a case, the viscosity of the lubricant is preferably from 5 to 250 cSt, more preferably from 10 to 200 cSt and more preferably from 20 to 150 cSt. When replacement is performed, these ranges apply to the initial lubricant and/or to the replacement lubricant. When replacement is performed, HFC-134a is preferably used as initial refrigerant fluid.

In some embodiments of the invention, when replacement is performed, the replacement lubricant is different from the initial lubricant, and the viscosity of the replacement lubricant is less than that of the initial lubricant. It is preferred for both the initial lubricant and the replacement lubricant to be POE lubricants as described above.

The viscosity of the replacement lubricant (in cSt) may thus be less by 1 to 2%; or by 2 to 3%; or by 3 to 4%, or by 4 to 5%; or by 5 to 10%; or by 10 to 15%; or by 15 to 20%; or by 20 to 25%; or by 25 to 30%; or by 30 to 40%; or by 40 to 50%; or by more than 50%; relative to the viscosity of the initial lubricant (in cSt).

The difference between the viscosity of the replacement lubricant and the viscosity of the initial lubricant may be, for example, from 1 to 2 cSt; or from 2 to 3 cSt; or from 3 to 4 cSt; or from 4 to 5 cSt; or from 5 to 10 cSt; or from 10 to 15 cSt; or from 15 to 20 cSt; or from 20 to 25 cSt; or from 25 to 30 cSt; or from 30 to 40 cSt; or from 40 to 50 cSt; or from 50 to 60 cSt; or from 60 to 70 cSt; or from 70 to 80 cSt; or from 80 to 90 cSt; or from 90 to 100 cSt; or from 100 to 150 cSt; or from 150 to 200 cSt; or from 200 to 250 cSt; or from 250 to 300 cSt; or more than 300 cSt.

EXAMPLES

The examples that follow illustrate the invention without limiting it.

In these examples, the installation contemplated is a refrigeration installation operating either with HFC-134a or with HFO-1234yf or with HFO-1234ze (in trans form). The lubricant used is an ISO 55 POE oil having a viscosity of 55 cSt at 40° C.

Example 1—Measurement of Solubility, Viscosity and Density

Solubility measurements are carried out according to the protocol below.

The instrument for measuring solubility is composed of a metal cell with window, equipped with a camera for viewing the inside of the cell. The cell is also equipped with sensors for absolute pressure, for differential pressure with high precision, for temperature and for measurement of dynamic viscosity. The sensor for measuring viscosity is immersed in the liquid phase of the test mixture.

All of the sensors are calibrated before the tests, so as to allow the pressure, temperature, viscosity and liquid volume in the cell to be measured. The density of the liquid phase is calculated from these measurements.

The whole of the cell is kept at constant temperature by a jacket system fed with a heat transfer fluid whose temperature can be regulated.

A defined amount of oil is introduced into the cell. The first tests involve measuring the viscosity of the oil at different temperatures. Defined quantities of gas are introduced gradually thereafter. After each addition of gas, the measurements are carried out over a defined temperature range.

The amount of gas in vapor phase in the gas space of the cell is calculated by measuring the liquid level and with prior knowledge of the behavior of pure gas as a function of the temperature and of the pressure.

The maximum quantity of gas dissolved in the liquid is calculated as a function of the mass of the gas introduced and the mass of the gas in the gas space.

Example 2—Determination of Solubility in a Vapor Compression System at the Inlet of the Compressor The installation contemplated is a vapor compression installation operating with HFC-134a, with HFO-1234yf or with HFO-1234ze. The pressures at the inlet of the compressor for each fluid are 1.47 bar (HFO-1234ze), 2.0 bar (HFC-134a) and 2.2 bar (HFO-1234yf), respectively. They correspond to the vapor saturation pressure of each fluid at −10° C. (the head losses being disregarded). Now considering a superheating of 10° C. or of 5° C. in the installation, the temperature at the compressor inlet is respectively 0° C. or −5° C.

The solubility of the oil/refrigerant mixture at the inlet of the compressor is therefore dependent on the operating pressure for each refrigerant fluid and on the temperature at the inlet of the compressor.

Figure 1:
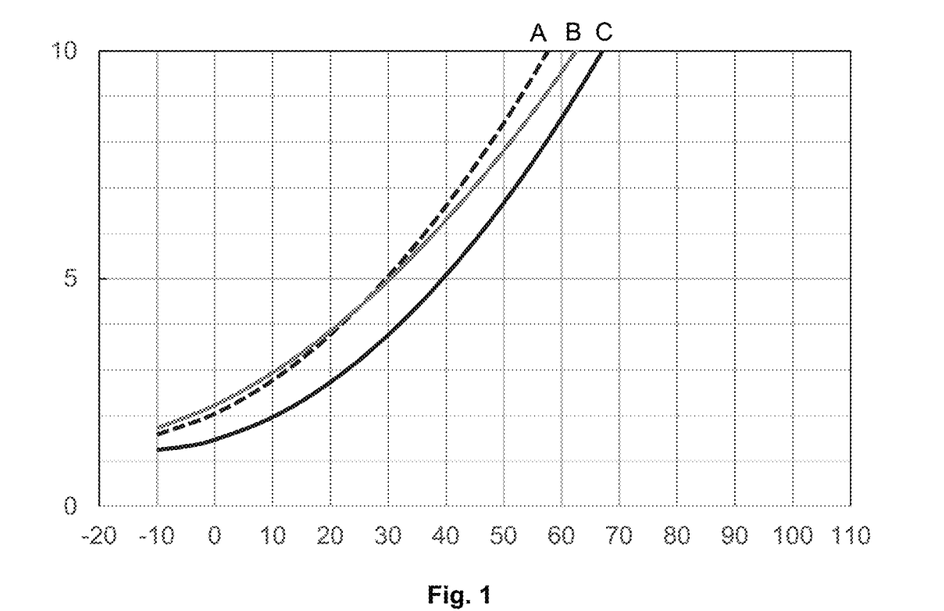
FIG. 1 shows the pressure at the inlet of the compressor (in bar, on the ordinate) as a function of the temperature at the inlet of the compressor (in ° C., on the abscissa), for three refrigerant fluid/lubricant mixtures A, B and C, as described in more detail in the Examples section.
Figure 2:
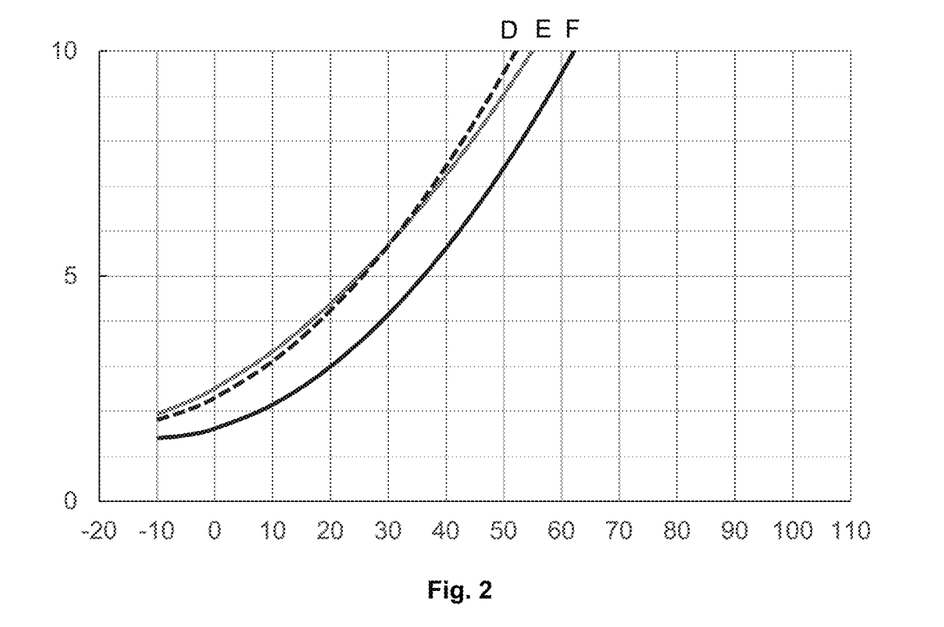
FIG. 2 shows the pressure at the inlet of the compressor (in bar, on the ordinate) as a function of the temperature at the inlet of the compressor (in ° C., on the abscissa), for three refrigerant fluid/lubricant mixtures D, E and F, as described in more detail in the Examples section.

FIGS. 1 and 2 show the pressure curves as a function of temperature, at constant solubility, for HFO-1234yf, HFO-1234ze and HFC-134a.

These curves were obtained by modelling on the basis of the measurement results from example 1, using the following methodology: the viscosity, the pressure and the density are expressed in the form of equations, as a function of the temperature and of the solubility. Each equation has a number of constants to be determined by regression depending on the above measurement results. The equation for the viscosity is a modified form of the Walther equation, having nine constants. The equation for the pressure also has nine constants. These two equations are described in the document Solubility, viscosity and density of refrigerant/lubricant mixtures by David R. Henderson (Spauschus Associates, Inc. 300 Corporate Center Court Eagle's Landing Stockbridge, Ga. 30281, April 1994) on page 3. The equation for the density is a linear equation as a function of the solubility (x) and of the temperature (t), with four constants for regression, following the measurement results (density=a+bt+cx+dxt, where a, b, c and d are constant). Therefore, for determining one of the parameters (temperature or pressure, density or viscosity or solubility), one only needs to solve a system of equations having several unknowns.

The mixtures of oil and of refrigerant fluid illustrated contain 22% of HFC-134a (curve A), 15% of HFO-1234yf (curve B) and 23.8% of HFO-1234ze (curve C), with superheating of 10° C. in the installation; or 26% of HFC-134a (curve D), 18.5% of HFO-1234yf (curve E) and 27.6% of HFO-1234ze (curve F) with superheating of 5° C. in the installation.

Accordingly, if the HFC-134a is replaced by HFO-1234yf, the solubility of the refrigerant fluid is reduced, even by reducing the overheating from 10° C. to 5° C. This is not the case with HFO-1234ze.

Example 3—Determination of Viscosity in a Vapor Compression System at the Inlet of the Compressor With the measuring instrument described in example 1, measurements were made of dynamic viscosity of different mixtures. The kinematic viscosity is calculated from the measurements of the dynamic viscosity and the density.

Contemplating the same system of example 2, the kinematic viscosity of the refrigerant fluid/oil mixture at a temperature of 0° C. and at the corresponding operating pressures (corresponding to an evaporation temperature of −10° C. and 10° C. of superheating) is 44 cSt with HFC-134a and 79 cSt with HFO-1234yf. It is 45.18 cSt with HFO-1234ze.

The kinematic viscosity of the refrigerant fluid/oil mixture at a temperature of −5° C. and at the corresponding operating pressures (corresponding to an evaporation temperature of −10° C. and 5° C. of superheating) is 38.6 cSt with HFC-134a and 69 cSt with HFO-1234yf. It is 40.3 cSt with HFO-1234ze.

Therefore, even by reducing the superheating, the oi/HFO-1234yf mixture retains a high viscosity relative to the reference with HFC-134a.

Figure 3:
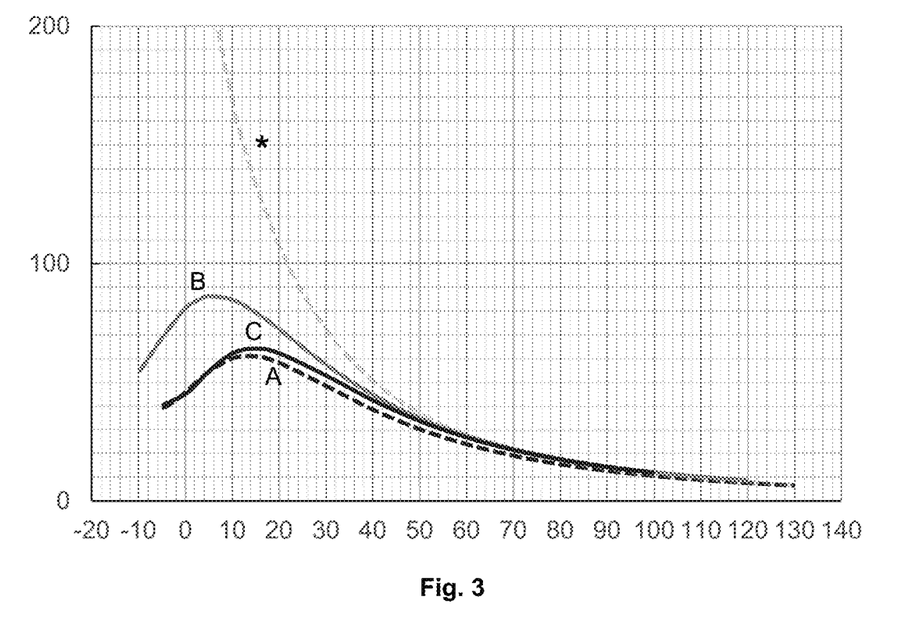
FIG. 3 shows the kinematic viscosity (in cSt, on the ordinate) as a function of the temperature at the inlet of the compressor (in ° C., on the abscissa), for three refrigerant fluid/lubricant mixtures A, B and C, as described in more detail in the Examples section.

FIG. 3 shows the kinematic viscosity as a function of the temperature at constant pressure for each refrigerant fluid under the pressure conditions of example 2. The curve labelled with an asterisk (*) corresponds to the oil alone. These curves result from the modelling discussed above of the measurement points.

It is noted that the viscosity behavior of HFO-1234yf is markedly different from that of HFC-134a and from that of HFO-1234ze when the temperature of the mixture is less than 40° C.

The table below summarizes the results obtained:

| Refrigerant fluid | HFC-134a | HFC-134a | HFO-1234yf | HFO-1234yf | HFO-1234ze | HFO-1234ze |
|---|---|---|---|---|---|---|
| Saturation pressure (bar) | 2 | 2 | 2.2 | 2.2 | 1.47 | 1.47 |
| Compressor inlet temperature | 0° C. | −5° C. | 0° C. | −5° C. | 0° C. | −5° C. |
| Superheating | 10° C. | 5° C. | 10° C. | 5° C. | 10° C. | 5° C. |
| Minimum oil temperature | 0° C. | −5° C. | 0° C. | −5° C. | 0° C. | −5° C. |
| Solubility | 22% | 26% | 15% | 18.5% | 23.8% | 27.6% |
| Viscosity (mm$^2$/s) | 44 | 38.6 | 79 | 69 | 45.2 | 40.3 |

Example 4—Performance

The performance of an installation was analyzed as follows, with the installation operating with a condensation temperature of 40° C., an evaporation temperature of −10° C. in evaporation, 7° C. of subcooling, and a superheating variable from 3° C. to 10° C. The thermodynamic properties were calculated using the Refprop software.

The results are presented in the table below:

| | $P_{max}$ (bar) | $P_{min}$ (bar) | $P_{max}/P_{min}$ Ratio | Superheat. (° C.) | RI | % CAP | % COP |
|---|---|---|---|---|---|---|---|
| HFC-134a | 10.2 | 2.0 | 5.07 | 10.0 | 77 | 100 | 100 |
| HFO-1234ze | 7.7 | 1.5 | 5.20 | 10.0 | 77 | 73 | 99 |
| HFO-1234yf | 10.2 | 2.2 | 4.59 | 10.0 | 79 | 95 | 97 |
| HFO1234yf | 10.2 | 2.2 | 4.59 | 9.0 | 79 | 96 | 98 |
| HFO-1234yf | 10.2 | 2.2 | 4.59 | 8.0 | 79 | 96 | 98 |
| HFO-1234yf | 10.2 | 2.2 | 4.59 | 7.0 | 79 | 97 | 99 |
| HFO-1234yf | 10.2 | 2.2 | 4.59 | 6.0 | 79 | 97 | 99 |
| HFO-1234yf | 10.2 | 2.2 | 4.59 | 5.0 | 79 | 98 | 100 |
| HFO-1234y | 10.2 | 2.2 | 4.59 | 4.0 | 79 | 98 | 100 |
| HFO-1234yf | 10.2 | 2.2 | 4.59 | 3.0 | 79 | 99 | 101 |

In this table, $P_{max}$ and $P_{min}$ denote the maximum and minimum pressures in the system, Superheat. denotes the superheating, RI denotes the isentropic yield, CAP denotes the volumetric capacity, and COP denotes the performance coefficient.

These results demonstrate that the performance coefficient (COP) and the volumetric capacity increase with the lowering of the superheating. Thus, the change from a superheating of 10° C. to 5° C. increases the COP by 3% and the capacity by 2%.

According to the invention, the lowering of superheating at the inlet of the compressor is possible by virtue of the low solubility of HFO-1234yf with the POE oils, relative to HFC-134a and to HFO-1234ze.

The invention claimed is:

1. A process of heat transfer by means of a heat transfer installation containing a heat transfer composition, the heat transfer composition comprising:
   a refrigerant fluid which comprises 2,3,3,3-tetrafluoropropene, and
   a lubricant;
in which the lubricant comprises a polyol ester, the solubility of the 2,3,3,3-tetrafluoropropene in the lubricant at 0° C. and at an absolute pressure of 2.2 bar being less than the solubility of 1,1,1,2-tetrafluoroethane in the lubricant at 0° C. and at an absolute pressure of 2.0 bar;
   the process comprising the successive steps:
      of evaporating a refrigerant fluid;
      of superheating the refrigerant fluid;
      of compressing the refrigerant fluid.
in which the superheating of the refererant fluid is from 2 to 10° C.

2. The process as claimed in claim 1, in which the superheating of the refrigerant fluid is from 3 to 5° C.

3. The process as claimed in claim 1, in which the lubricant comprises a dipentaerythritol ester.

4. The process as claimed in claim 1, in which the lubricant has a kinematic viscosity at 40° C. of 10 to 200 cSt.

5. The process as claimed in claim 1, which is an air conditioning and/or mobile or stationary heating process or refrigeration, freezing or deep-freezing process.

6. The process as claimed in claim 1, in which the refrigerant fluid is evaporated at an average temperature of less than or equal to 10° C.

7. The process as claimed in claim 1, in which the refrigerant fluid is compressed in a screw compressor.

8. The process as claimed in claim 1, in which the heat transfer installation is an installation intended to operate with an initial heat transfer composition comprising:
   an initial refrigerant fluid, and
   an initial lubricant,
the initial heat transfer composition being different from the heat transfer composition used in the process.

9. The process as claimed in claim 1, in which said heat transfer composition is a replacement heat transfer composition, which is used as replacement for an initial heat transfer composition comprising:
   an initial refrigerant fluid, and
   an initial lubricant.

10. The process as claimed in claim 9, in which the superheating with the replacement heat transfer composition is less than the superheating when the same process is implemented with the initial heat transfer composition.

11. The process as claimed in claim 9, in which the lubricant of the replacement heat transfer composition is identical to the initial lubricant.

12. The process as claimed in claim 9, in which the lubricant of the replacement heat transfer composition is different from the initial lubricant.

13. The process as claimed in claim 12, in which the lubricant of the replacement heat transfer composition has a kinematic viscosity at 40° C. which is less than or equal to the kinematic viscosity at 40° C. of the initial lubricant.

14. The process as claimed in claim 9, in which the initial lubricant comprises a polyol ester.

15. The process as claimed in claim 8, in which the initial refrigerant fluid comprises 1,1,1,2-tetrafluoroethane.

16. A process of heat transfer by means of a heat transfer installation containing a heat transfer composition, the heat transfer composition comprising:
   a refrigerant fluid which comprises 2,3,3,3-tetrafluoropropene, and
   a lubricant;
in which the lubricant comprises a polyol ester, the solubility of the 2,3,3,3-tetrafluoropropene in the lubricant at 0° C. and at an absolute pressure of 2.2 bar being less than the solubility of 1,1,1,2-tetrafluoroethane in the lubricant at 0° C. and at an absolute pressure of 2.0 bar;

the process comprising the successive steps:
- of evaporating a refrigerant fluid;
- of superheating the refrigerant fluid;
- of compressing the refrigerant fluid, in which the heat transfer composition is a replacement heat transfer composition, which is used as replacement for an initial heat transfer composition comprising:
- an initial refrigerant fluid, and
- an initial lubricant, in which the superheating with the replacement heat transfer composition is less than the superheating when the same process is implemented with the initial heat transfer composition.

17. The process as claimed in claim 16, in which the lubricant of the replacement heat transfer composition is identical to the initial lubricant.

18. The process as claimed in claim 16, in which the lubricant of the replacement heat transfer composition is different from the initial lubricant.

19. The process as claimed in claim 18, in which the lubricant of the replacement heat transfer composition has a kinematic viscosity at 40° C. which is less than or equal to the kinematic viscosity at 40° C. of the initial lubricant.

20. The process as claimed in claim 16, in which the initial lubricant comprises a polyol ester.

21. The process as claimed in claim 16, in which the superheating of the refrigerant fluid is from 2 to 10° C.

22. The process as claimed in claim 16, in which the superheating of the refrigerant fluid is from 3 to 5° C.

\* \* \* \* \*